US 11,899,336 B2

(12) United States Patent
Shibuya et al.

(10) Patent No.: US 11,899,336 B2
(45) Date of Patent: Feb. 13, 2024

(54) LIQUID CRYSTAL ELEMENT

(71) Applicant: OSAKA UNIVERSITY, Osaka (JP)

(72) Inventors: Giichi Shibuya, Suita (JP); Sunri Lee, Suita (JP); Hiroyuki Yoshida, Suita (JP); Masanori Ozaki, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 170 days.

(21) Appl. No.: 17/604,986

(22) PCT Filed: Apr. 17, 2020

(86) PCT No.: PCT/JP2020/016911
§ 371 (c)(1),
(2) Date: Apr. 15, 2022

(87) PCT Pub. No.: WO2020/213723
PCT Pub. Date: Oct. 22, 2020

(65) Prior Publication Data
US 2023/0176446 A1    Jun. 8, 2023

(30) Foreign Application Priority Data

Apr. 19, 2019 (JP) .................................. 2019-080133

(51) Int. Cl.
*G02F 1/29* (2006.01)
*G02B 3/14* (2006.01)

(52) U.S. Cl.
CPC ............. *G02F 1/294* (2021.01); *G02B 3/14* (2013.01)

(58) Field of Classification Search
None
See application file for complete search history.

(56) References Cited

U.S. PATENT DOCUMENTS

| 6,882,482 B2 | 4/2005 | Ogasawara |
| 10,095,081 B2 | 10/2018 | Shibuya et al. |
| 10,598,961 B2 | 3/2020 | Shibuya et al. |
| 10,761,245 B2 | 9/2020 | Shibuya et al. |

(Continued)

FOREIGN PATENT DOCUMENTS

| JP | S63-249125 A | 10/1988 |
| JP | 2004-101885 A | 4/2004 |

(Continued)

OTHER PUBLICATIONS

International Search Report issued in PCT/JP2020/016911; dated Jun. 16, 2020.

(Continued)

*Primary Examiner* — Ryan Crockett
(74) *Attorney, Agent, or Firm* — Studebaker & Brackett PC

(57) ABSTRACT

A liquid crystal element is provided that can inhibit occurrence of voltage drop between one end and the other end of each electrode. A liquid crystal element (100) includes a liquid crystal layer LQ, a plurality of first arcuate electrodes (1), and a plurality of second arcuate electrodes (2). The first arcuate electrodes (1) are disposed concentrically about an optical axis (AX) of the liquid crystal element (100) and applies first voltage (V1) to the liquid crystal layer (LQ). The second arcuate electrodes (2) are disposed concentrically about the optical axis (AX) and applies second voltage (V2) to the liquid crystal layer (LQ).

19 Claims, 14 Drawing Sheets

(56) References Cited

U.S. PATENT DOCUMENTS

| | | | |
|---|---|---|---|
| 2001/0040743 A1* | 11/2001 | Graves | G02F 1/29 |
| | | | 359/849 |
| 2004/0108984 A1* | 6/2004 | Ogasawara | G02F 1/29 |
| 2007/0183293 A1* | 8/2007 | Murata | G11B 7/13925 |
| | | | 369/112.02 |
| 2008/0212007 A1 | 9/2008 | Meredith | |
| 2013/0088637 A1* | 4/2013 | Duparre | H04N 23/45 |
| | | | 348/360 |
| 2013/0342887 A1* | 12/2013 | Leister | G03H 1/0248 |
| | | | 359/254 |
| 2015/0029424 A1* | 1/2015 | Gordon | G02C 7/083 |
| | | | 349/13 |
| 2015/0309342 A1 | 10/2015 | Galstian et al. | |
| 2016/0000557 A1* | 1/2016 | Galstian | A61F 2/16 |
| | | | 623/6.22 |
| 2016/0077402 A1* | 3/2016 | Takehara | F21S 41/645 |
| | | | 349/33 |
| 2016/0165106 A1 | 6/2016 | Duparre | |
| 2018/0031947 A1 | 2/2018 | Shibuya et al. | |
| 2018/0052377 A1* | 2/2018 | Gordon | G02F 1/13439 |
| 2018/0246354 A1* | 8/2018 | Popovich | G02F 1/133526 |
| 2018/0356652 A1 | 12/2018 | Shibuya et al. | |
| 2019/0187339 A1* | 6/2019 | Shibuya | G02B 3/10 |
| 2019/0302567 A1* | 10/2019 | Chen | G02C 7/083 |
| 2020/0355853 A1 | 11/2020 | Shibuya et al. | |

FOREIGN PATENT DOCUMENTS

| | | |
|---|---|---|
| JP | 2006-091392 A | 4/2006 |
| JP | 2009-181142 A | 8/2009 |
| JP | 2014-530581 A | 11/2014 |
| JP | 2016-057541 A | 4/2016 |
| JP | 2019-002977 A | 1/2019 |
| WO | 2016/117604 A1 | 7/2016 |
| WO | 2018/016390 A1 | 1/2018 |

OTHER PUBLICATIONS

An Office Action; "Notice of Reasons for Refusal," mailed by the Japanese Patent Office dated Aug. 9, 2022, which corresponds to Japanese Patent Application No. 2021-514243 and is related to U.S. Appl. No. 17/604,986; with English language translation.

An Office Action; "Notice of Reasons for Refusal," mailed by the Japanese Patent Office dated Nov. 15, 2022, which corresponds to Japanese Patent Application No. 2021-514243 and is related to U.S. Appl. No. 17/604,986; with English language translation.

* cited by examiner

LIQUID CRYSTAL ELEMENT

TECHNICAL FIELD

The present invention relates to a liquid crystal element.

BACKGROUND ART

The liquid crystal lens (liquid crystal element) disclosed in Patent Literature 1 includes a plurality of annular electrodes and a lead wire. The annular electrodes are arranged concentrically. The lead wire extends in the radial direction of the liquid crystal lens. The lead wire is connected to one end of each of the annular electrodes and applies voltage to the annular electrodes.

CITATION LIST

Patent Literature

[Patent Literature 1] Japanese Patent Application Laid-Open Publication No. 2004-101885

SUMMARY OF INVENTION

Technical Problem

However, in the liquid crystal lens disclosed in Patent Literature 1, voltage drop may occur between the one ends of the electrodes connected to the lead wire and the other ends of the electrodes not connected to the lead wire. This is because the lengths of the electrodes are relatively long due to the electrodes being ring-shaped.

In particular, in the liquid crystal lens, an electrode located further outward has a larger radius and therefore has a longer length. As a result, voltage drop is more likely to occur between one end and the other end of an electrode located outward than between one end and the other end of an electrode located inward. Furthermore, electrodes of a liquid crystal lens with a relatively large diameter have long lengths. As a result, voltage drop is more likely to occur between one ends and the other ends of electrodes in a liquid crystal lens with a relatively large diameter than between one ends and the other ends of electrodes in a liquid crystal lens with a relatively small diameter.

When voltage drop occurs between one end and the other end of each the electrode, uniform driving of the liquid crystal lens across the entire liquid crystal lens may not be achieved.

The present invention has been made in view of the foregoing and has its object of providing a liquid crystal element that can inhibit occurrence of voltage drop between one end and the other end of each electrode.

Solution to Problem

According to an aspect of the present invention, a liquid crystal element includes a liquid crystal layer, a plurality of first arcuate electrodes, and a plurality of second arcuate electrodes. The first arcuate electrodes are disposed concentrically about an optical axis of the liquid crystal element and apply first voltage to the liquid crystal layer. The second arcuate electrodes are disposed concentrically about the optical axis and apply second voltage to the liquid crystal layer.

Preferably, the liquid crystal element according to the present invention has an electrode placement area in which the first arcuate electrodes and the second arcuate electrodes are disposed. The electrode placement area preferably includes an annular band-shaped area. The annular band-shaped area preferably includes a plurality of arcuate band-shaped areas arranged side by side in a circumferential direction about the optical axis. In each of the arcuate band-shaped areas, preferably, at least one first arcuate electrode of the first arcuate electrodes and at least one second arcuate electrode of the second arcuate electrodes are disposed.

In the liquid crystal element according to the present invention, preferably, the electrode placement area includes a plurality of the annular band-shaped areas. Preferably, the annular band-shaped areas are arranged side by side in a radial direction to the optical axis. Preferably, the number of the arcuate band-shaped areas included in an annular band-shaped area, of the annular band-shaped areas, located outward in the radial direction is larger than the number of the arcuate band-shaped areas included in an annular band-shaped area, of the annular band-shaped areas, located inward in the radial direction.

The liquid crystal element according to the present invention preferably further includes at least one first annular electrode and at least one second annular electrode. The first annular electrode preferably applies the first voltage to the liquid crystal layer. The second annular electrode preferably applies the second voltage to the liquid crystal layer. Preferably, the electrode placement area further includes a circular area located inside of the annular band-shaped area in a radial direction to the optical axis. The at least one first annular electrode and the at least one second annular electrode are preferably disposed in the circular area.

The liquid crystal element according to the present invention preferably further includes a center electrode with an annular shape. The center electrode is preferably disposed in the circular area. Preferably, the center electrode is disposed inside of the at least one first annular electrode and the at least one second annular electrode in the radial direction. Preferably, the at least one first annular electrode and the at least one second annular electrode adjacent to each other in the radial direction constitute a unit electrode. Preferably, each of unit electrodes is constituted by one of the first arcuate electrodes and one of the second arcuate electrodes adjacent to each other in the radial direction. Preferably, a unit electrode, of the unit electrode and the unit electrodes, located outside of a specific location in the radial direction has a radius smaller than a corresponding radius Un of radii Un expressed by formula (1) and formula (2). Preferably, the formula (2) includes a radius Sc of the center electrode, and expresses a radius Sn of an n-th unit electrode of N unit electrodes arranged side by side in the radial direction, the n-th unit electrode being located n-th from the optical axis.

[Formula 1]

$$Sn - 0.1 \times Sn \leq Un \leq Sn + 0.1 \times Sn \quad (1)$$

$$Sn = (n+1)^{\frac{1}{2}} \times Sc \quad (2)$$

In the liquid crystal element according to the present invention, preferably, the electrode placement area further includes a non-circular area located outside of the annular band-shaped area in a radial direction to the optical axis. Preferably, at least one first arcuate electrode of the first arcuate electrodes and at least one second arcuate electrode of the second arcuate electrodes are disposed in the non-circular area.

The liquid crystal element according to the present invention preferably further includes a first radial direction lead wire and a second radial direction lead wire. Preferably, the first radial direction lead wire extends outward in a radial direction to the optical axis. Preferably the second radial direction lead wire extends outward in the radial direction. Preferably, the first radial direction lead wire is connected to one end of a first arcuate electrode of the first arcuate electrodes. Preferably, the second radial direction lead wire is connected to one end of a second arcuate electrode of the second arcuate electrodes. Preferably, the first radial direction lead wire has a resistance per unit length lower than a resistance per unit length of each of the first arcuate electrodes. Preferably, the second radial direction lead wire has a resistance per unit length lower than a resistance per unit length of each of the second arcuate electrodes.

The liquid crystal element according to the present invention preferably further includes a first circumferential lead wire and a second circumferential lead wire. Preferably, the first circumferential direction lead wire extends in a circumferential direction about the optical axis. Preferably, the second circumferential direction lead wire extends in the circumferential direction. Preferably, the first circumferential direction lead wire and the second circumferential direction lead wire are disposed outside of the first arcuate electrodes and the second arcuate electrodes in the radial direction. Preferably, one end of the first circumferential direction lead wire is connected to an end of the first radial direction lead wire in the radial direction. Preferably, one end of the second circumferential direction lead wire is connected to an end of the second radial direction lead wire in the radial direction. Preferably, the first circumferential direction lead wire has a resistance per unit length lower than a resistance per unit length of each of the first arcuate electrodes. Preferably, the second circumferential direction lead wire has a resistance per unit length lower than a resistance per unit length of each of the second arcuate electrodes.

The liquid crystal element according to the present invention preferably further includes a first annular electrode and a second annular electrode. Preferably, the first annular electrode applies the first voltage to the liquid crystal layer. Preferably, the second annular electrode applies the second voltage to the liquid crystal layer.

Preferably, the liquid crystal element has an electrode placement area. Preferably, the electrode placement area includes a circular area and a non-circular area. Preferably, the first annular electrode and the second annular electrode are disposed in the circular area. Preferably, the non-circular area is located outside of the circular area in a radial direction to the optical axis. Preferably, at least one first arcuate electrode of the first arcuate electrodes and at least one second arcuate electrode of the second arcuate electrodes are disposed in the non-circular area.

In the liquid crystal element according to the present invention, preferably, the liquid crystal element has an electrode placement area in which the first arcuate electrodes and the second arcuate electrodes are disposed. Preferably, the electrode placement area includes a plurality of circumferential direction areas arranged side by side in a circumferential direction about the optical axis. Preferably, at least one first arcuate electrode of the first arcuate electrodes and at least one second arcuate electrode of the second arcuate electrodes are disposed in each of the circumferential direction areas. Preferably, the circumferential direction areas include at least two circumferential direction areas that set different focal lengths.

In the liquid crystal element according to the present invention, preferably, the at least two circumferential direction areas cause an astigmatism by setting the different focal lengths.

In the liquid crystal element according to the present invention, preferably, paired circumferential direction areas of the circumferential direction areas set substantially the same focal length. The paired circumferential direction areas are located opposite to each other in a radial direction to the optical axis with the optical axis therebetween In the liquid crystal element according to the present invention, preferably, the number of the circumferential direction areas is an even number. Preferably, the number of circumferential direction area sets is an even number. The circumferential direction area sets each are the paired circumferential direction areas. Preferably, the even number of circumferential direction area sets include at least two circumferential direction area sets that set different focal lengths.

In the liquid crystal element according to the present invention, preferably, each of the circumferential direction areas has a central angle of less than or equal to 90 degrees.

Advantageous Effects of Invention

According to the present invention, a liquid crystal element can be provided that can inhibit occurrence of voltage drop between one end and the other end of each electrode.

DESCRIPTION OF EMBODIMENTS

Figure 1:
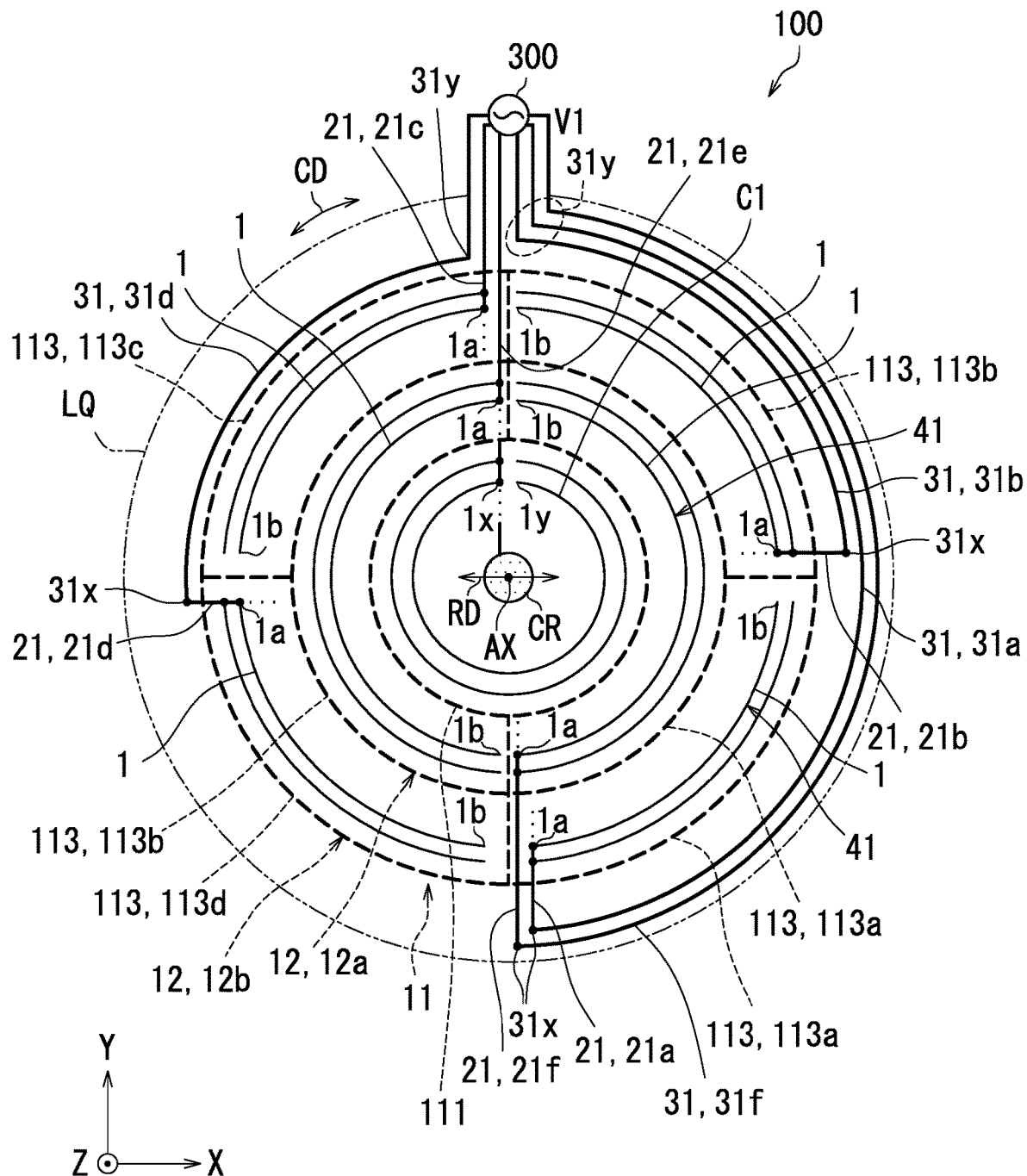
FIG. 1 is a plan view of a part of a liquid crystal element according to a first embodiment of the present invention.

Embodiments of the present invention will be described below with reference to the accompanying drawings. Note that elements that are the same or equivalent are indicated by the same reference signs in the drawings and description thereof is not repeated. Also, in the embodiments of the present invention, an X axis, a Y axis, and a Z axis of a three-dimensional Cartesian coordinate system are marked as appropriate in order to facilitate understanding of the drawings.

First Embodiment

The following describes a liquid crystal element 100 according to a first embodiment of the present invention with reference to FIGS. 1 to 5. In the first embodiment, the liquid crystal element 100 functions as a liquid crystal lens. For example, the liquid crystal element 100 functioning as a liquid crystal lens can be adopted to a lens of eyeglasses.

FIG. 1 is a plan view of a part of the liquid crystal element 100 according to the first embodiment. As illustrated in FIG. 1, the liquid crystal element 100 has an optical axis AX. The optical axis AX corresponds to an optical axis of the liquid crystal element 100 functioning as a liquid crystal lens. Specifically, the optical axis AX is an imaginary straight line passing through the center and the focal point of the liquid crystal element 100 functioning as a liquid crystal lens. That is, the optical axis AX is an imaginary straight line that matches the axis of rotational symmetry of the liquid crystal element 100 functioning as a liquid crystal lens and that is orthogonal to the liquid crystal element 100. In the first embodiment, a circumferential direction CD refers to a circumferential direction about the optical axis AX. A radial direction RD refers to a radial direction to the optical axis AX.

The liquid crystal element 100 includes a liquid crystal layer LQ and a plurality of first arcuate electrodes 1. Note that later-described second arcuate electrodes 2 are omitted from FIG. 1 in order to simplify the drawing.

The liquid crystal element 100 is connected to a first power source 300. The first power source 300 applies first voltage V1 to the liquid crystal element 100. The first voltage V1 is an alternating current voltage.

The liquid crystal layer LQ is formed of liquid crystal. The liquid crystal includes a large number of liquid crystal molecules. For example, the liquid crystal is nematic liquid crystal and is in a homogenous orientation in an environment with a non-electric field where neither the first voltage V1 nor second voltage V2 is applied. The liquid crystal is transparent, for example. In the present description, the term "transparency" includes colored transparency, colorless transparency, and translucency.

Each of the first arcuate electrodes applies the first voltage V1 to the liquid crystal layer LQ. The first arcuate electrodes 1 are arranged substantially concentrically about the optical axis AX. The first arcuate electrodes 1 each are substantially arc-shaped. Of the first arcuate electrodes 1, two or more first arcuate electrodes 1 that are located on the same circumference constitute a first electrode 41. As such, a plurality of first electrodes 41 are arranged substantially concentrically about the optical axis AX in the liquid crystal element 100. First arcuate electrodes 1 adjacent to each other in the circumferential direction CD are separate from each other in the circumferential direction CD. First arcuate electrodes 1 adjacent to each other in the radial direction RD are separate from each other in the radial direction RD.

In the present description, "being arranged concentrically" means that a plurality of arrangement targets are arranged on a plurality of concentric circles. In this case, it is possible that a single arrangement target is arranged on a single concentric circle or a plurality of arrangement targets are arranged on a single concentric circle.

As has been described with reference to FIG. 1, the first electrodes 41 each are constituted by a plurality of first arcuate electrodes 1 in the first embodiment. As such, the lengths of the first arcuate electrodes 1 in the circumferential direction CD are shorter than those in a configuration in which a plurality of first electrodes 41 are each composed of a single substantially annular electrode. As a result, occurrence of voltage drop between one end 1a and another end 1b of each first arcuate electrode 1 can be inhibited in application of the first voltage V1 to the one end 1a of each first arcuate electrode 1.

For example, the lengths in the circumferential direction CD of the first arcuate electrodes 1 with a central angle of approximately less than or equal to 180 degrees is ½ or less than that in a configuration in which the first electrodes 41 are each constituted by a single substantially annular electrode with a central angle of approximately 360 degrees. Therefore, occurrence of voltage drop between the one end 1a and the other end 1b of each first arcuate electrode 1 can be inhibited effectively.

The liquid crystal element 100 will be described with further reference to FIG. 1. Preferably, the liquid crystal element 100 further includes at least one first radial direction lead wire 21. In the first embodiment, the liquid crystal element 100 includes a plurality of first radial direction lead wires 21. Note that later-described second radial direction lead wires 22 are omitted from FIG. 1 in order to simplify the drawing.

The first radial direction lead wires 21 extend outward in the radial direction RD. The first radial direction lead wires 21 extend substantially linearly. The first radial direction lead wires 21 are each connected to the one end 1a of a corresponding one of the first arcuate electrodes 1. The first voltage V1 is applied to the first arcuate electrodes 1 via the corresponding first radial direction lead wires 21. The other end 1b of a first arcuate electrode 1 separates in the circumferential direction CD from the one end 1a of another first arcuate electrode 1 located opposite thereto in the circumferential direction CD. The first radial direction lead wires 21 extend radially to the optical axis AX.

The first radial direction lead wires 21 have a resistance per unit length lower than the resistance per unit length of the first arcuate electrodes 1. Therefore, voltage drop in the first radial direction lead wires 21 can be inhibited in the first embodiment.

For example, the first radial direction lead wires 21 have an electrical resistivity lower than the electrical resistivity of the first arcuate electrodes 1. For example, the first radial direction lead wires 21 have a width in the circumferential direction CD narrower than the width of the first arcuate electrodes 1 in the radial direction RD. For example, the first radial direction lead wires 21 have a resistance lower than the resistance of the first arcuate electrodes 1.

Preferably, the liquid crystal element 100 further includes at least one first circumferential direction lead wire 31. In the first embodiment, the liquid crystal element 100 includes a plurality of first circumferential direction lead wires 31. Note that later-described second circumferential direction lead wires 32 are omitted from FIG. 1 in order to simplify the drawing.

The first circumferential direction lead wires 31 extend in the circumferential direction CD. The first circumferential direction lead wires 31 each are substantially arc-shaped. One ends 31x of the first circumferential direction lead wires 31 are each connected to ends of a corresponding one of the first radial direction lead wires 21 in the radial direction RD. Other ends 31y of the first circumferential direction lead wires 31 are connected to the first power source 300. The first power source 300 applies the first voltage V1 to the first circumferential direction lead wires 31. As such, the first voltage V1 is applied to the first radial direction lead wires 21 via the first circumferential direction lead wires 31.

The first circumferential direction lead wires 31 have a resistance per unit length lower than the resistance per unit length of the first arcuate electrodes 1. Therefore, voltage drop in the first circumferential direction lead wires 31 can be inhibited in the first embodiment.

For example, the first circumferential direction lead wires 31 have an electrical resistivity lower than the electrical resistivity of the first arcuate electrodes 1. For example, the first circumferential direction lead wires 31 have a width in the radial direction RD narrower than the width of the first arcuate electrodes 1 in the radial direction RD. For example, the first circumferential direction lead wires 31 have a resistance lower than the resistance of the first arcuate electrodes 1.

Preferably, the liquid crystal element 100 further includes at least one first annular electrode C1. In the first embodiment, the liquid crystal element 100 includes a plurality of first annular electrodes C1. The first annular electrodes C1 are arranged substantially concentrically about the optical axis AX. In other words, the optical axis AX matches the axis of rotational symmetry of a substantially concentric electrode pattern. Note that later-described second annular electrodes C2 are omitted from FIG. 1 in order to simplify the drawing.

The first annular electrodes C1 each have a substantially ring shape that is partially broken. The first annular electrodes C1 are separate from each other in the radial direction RD. One end 1x and another end 1y of each first annular electrode C1 are separate from each other in the circumferential direction CD. The one ends 1x of the first annular electrodes C1 are connected to the corresponding first radial direction lead wires 21. The first voltage V1 is applied to the first annular electrodes C1 via the first radial direction lead wires 21.

Preferably, the liquid crystal element 100 further includes a core electrode CR. The core electrode CR has a substantially disk shape. The term disk shape means a shape of a circular plane. The optical axis AX is substantially orthogonal to the core electrode CR and passes through the center of the core electrode CR. The first annular electrodes C1 and the first arcuate electrodes 1 are arranged outside of the core electrode CR in the radial direction RD. The core electrode CR is connected to an end of one of the first radial direction lead wires 21. The first voltage V1 is applied to the core electrode CR via the first radial direction lead wire 21.

The liquid crystal element 100 will be described in detail with further reference to FIG. 1. The liquid crystal element 100 has an electrode placement area 11. The electrode placement area 11 has a substantially circular shape. The core electrode CR, the first annular electrodes C1, and the first arcuate electrodes 1 are arranged in the electrode placement area 11.

The electrode placement area 11 includes a circular area 111 and at least one annular band-shaped area 12. In the first embodiment, the electrode placement area 11 includes a plurality of annular band-shaped areas 12.

The circular area 111 has a substantially circular shape. The circular area 111 is located inside of the annular band-shaped areas 12 in the radial direction RD. The first annular electrodes C1 are arranged in the circular area 111. As such, in the liquid crystal element 100 in the first embodiment, the first annular electrodes C1 are arranged inward in the radial direction RD without being divided. In the above configuration, the wiring layout is simplified to facilitate formation of the first annular electrodes C1. In addition, the lengths of the first annular electrodes C1 located inward in the radial direction RD in the liquid crystal element 100 are relatively short. Accordingly, voltage drop can be inhibited from occurring between the one end 1x and the other end 1y of each first annular electrode C1.

The annular band-shaped areas 12 each have a substantially annular band shape. The annular band-shaped areas 12 each have a plurality of arcuate band-shaped areas 113. The arcuate band-shaped areas 113 each are substantially arcuate band-shaped. In each of the annular band-shaped areas 12, the arcuate band-shaped areas 113 are arranged side by side in the circumferential direction CD. At least one of the first arcuate electrodes 1 is disposed in each of the arcuate band-shaped areas 113. In the first embodiment, two or more first arcuate electrodes 1 are disposed in each of the arcuate band-shaped areas 113.

In the first embodiment, each of the annular band-shaped areas 12 of the electrode placement area 11 is divided to define the arcuate band-shaped areas 113 in each of the annular band-shaped areas 12, and the first arcuate electrodes 1 are disposed in each of the arcuate band-shaped areas 113. As such, the first arcuate electrodes 1 arranged side by side in the circumferential direction CD can be easily formed in each of the annular band-shaped areas 12.

Furthermore, the annular band-shaped areas 12 in the first embodiment are arranged side by side in the radial direction RD. The number of the arcuate band-shaped areas 113 included in the annular band-shaped areas 12b located outward in the radial direction RD is greater than the number of the arcuate band-shaped areas 113 included in the annular band-shaped areas 12a located inward in the radial direction RD in the liquid crystal element 100. In other words, the number of the first arcuate electrodes constituting the first electrodes 41 included in the annular band-shaped areas 12b located outward in the radial direction RD is greater than the number of the first arcuate electrodes 1 constituting the first electrodes 41 included in the annular band-shaped areas 12a located inward in the radial direction RD in the liquid crystal element 100. Accordingly, even in a configuration in which the circumferential length of a first electrode 41 located outward in the liquid crystal element 100 may be lengthy in the radial direction RD, the length of each first arcuate electrode 1 constituting the corresponding first electrodes 41 can be relatively short. As a result, voltage drop can be inhabited from occurring between the one end 1a and the other end 1b of even a first arcuate electrode 1 located outward in the radial direction RD.

Note that the circular area 111 and the annular band-shaped areas 12 are arranged substantially concentrically about the optical axis AX.

Here, as illustrated in FIG. 1, the first radial direction lead wires 21a to 21d are respectively connected to the one ends 1a of the first arcuate electrodes 1 in the arcuate band-shaped areas 113a to 113d included in the annular band-shaped areas 12b. That is, the first radial direction lead wires 21 are arranged in each of the arcuate band-shaped areas 113 in the annular band-shaped areas 12.

Furthermore, the first radial direction lead wires 21e are connected to the core electrode CR, the one ends 1x of the first annular electrodes C1 in the circular area 111, and the one ends 1a of the first arcuate electrodes 1 in the arcuate band-shaped area 113b included in the annular band-shaped area 12a. The first radial direction lead wire 21f is connected to the one ends 1a of the first arcuate electrodes 1 in the arcuate band-shaped area 113a included in the annular band-shaped areas 12a.

Moreover, the one ends 31x of the first circumferential direction lead wires 31a, 31b, 31d, and 31f are respectively connected to ends of the first radial direction lead wires 21a, 21b, 21d, and 21f in the radial direction RD.

Figure 2:
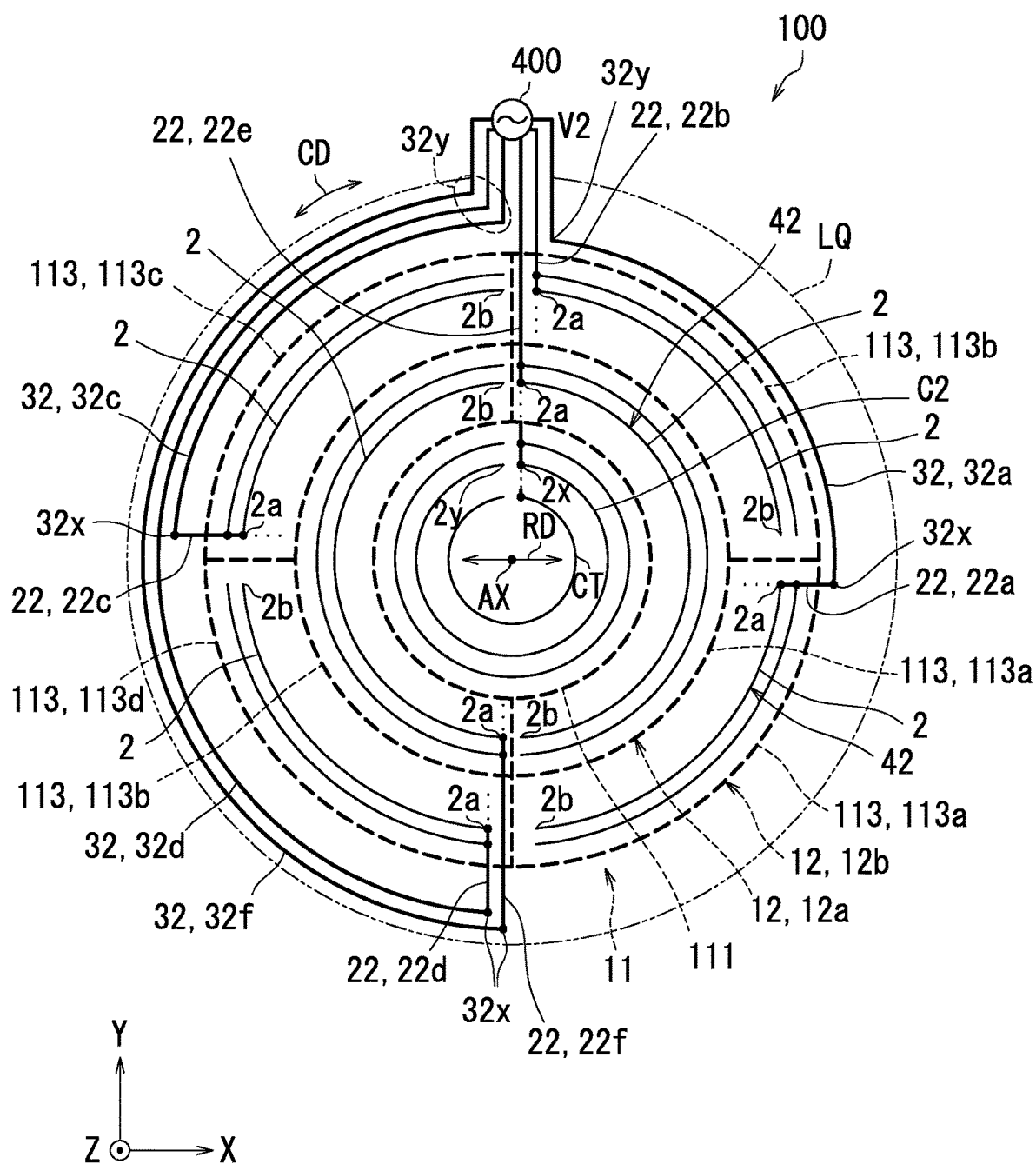
FIG. 2 is a plan view of another part of the liquid crystal element according to the first embodiment.

The liquid crystal element 100 will be described next with reference to FIG. 2. FIG. 2 is a plan view of another part of the liquid crystal element 100 according to the first embodiment. As illustrated in FIG. 2, the liquid crystal element 100 further includes a plurality of second arcuate electrodes 2. Note that the first arcuate electrodes 1 are omitted from FIG. 2 in order to simplify the drawing.

The liquid crystal element 100 is connected to a second power source 400. The second power source 400 applies second voltage V2 to the liquid crystal element 100. The second voltage V2 is an alternating current voltage. The second voltage V2 differs from the first voltage V1. For example, the maximum amplitude or the effective value of the second voltage V2 differs from the maximum amplitude or the effective value of the first voltage V1.

Each of the second arcuate electrodes 2 applies the second voltage V2 to the liquid crystal layer LQ. The second arcuate electrodes 2 are arranged substantially concentrically about the optical axis AX. The second arcuate electrodes 2 each are substantially arc-shaped. Of the second arcuate electrodes 2, two or more second arcuate electrodes 2 that are located on the same circumference constitute a second electrode 42. As such, a plurality of second electrodes 42 are arranged substantially concentrically about the optical axis AX in the liquid crystal element 100. Second arcuate electrodes 2 adjacent to each other in the circumferential direction CD are separate from each other in the circumferential direction CD. Second arcuate electrodes 2 adjacent to each other in the radial direction RD are separate from each other in the radial direction RD.

As described with reference to FIG. 2, the second electrodes 42 are each constituted by a plurality of second arcuate electrodes 2 in the first embodiment. As such, the lengths of the second arcuate electrodes 2 in the circumferential direction CD are shorter than those in a configuration in which each second electrode 42 is constituted by a single substantially annular electrode. Accordingly, voltage drop can be inhibited from occurring between one end 2a and another end 2b of each second arcuate electrode 2 when the second voltage V2 is applied to the one end 2a of each second arcuate electrode 2.

For example, the length in the circumferential direction CD of a second arcuate electrode 2 with a central angle of approximately less than or equal to 180 degrees is ½ or less than that in a configuration in which the second electrodes 42 are each constituted by a single substantially annular electrode with a central angle of approximately 360 degrees. Accordingly, voltage drop can be effectively inhibited from occurring between the one end 2a and the other end 2b of each second arcuate electrode 2.

The liquid crystal element 100 will be described with further reference to FIG. 2. Preferably, the liquid crystal element 100 further includes at least one second radial direction lead wire 22. In the first embodiment, the liquid crystal element 100 includes a plurality of second radial direction lead wires 22. Note that the first radial direction lead wires 21 are omitted from FIG. 2 in order to simplify the drawing.

The second radial direction lead wires 22 extend outward in the radial direction RD. The second radial direction lead wires 22 extend substantially linearly. The second radial direction lead wires 22 are connected to the one ends 2a of the second arcuate electrodes 2. The second voltage V2 is applied to the second arcuate electrodes 2 via the second radial direction lead wires 22. The other end 2b of a second arcuate electrode 2 separate in the circumferential direction CD from the one end 2a of another second arcuate electrode 2 located opposite thereto in the circumferential direction CD. The second radial direction lead wires 22 extend radially to the optical axis AX.

The second radial direction lead wires 22 have a resistance per unit length lower than the resistance per unit length of the second arcuate electrodes 2. Therefore, voltage drop in the second radial direction lead wires 22 can be inhibited in the first embodiment.

For example, the second radial direction lead wires 22 have an electrical resistivity lower than the electrical resistivity of the second arcuate electrodes 2. For example, the second radial direction lead wires 22 have a width in the circumferential direction CD narrower than the width in the radial direction RD of the second arcuate electrodes 2. For example, the second radial direction lead wires 22 have a resistance lower than the resistance of the second arcuate electrodes 2.

Preferably, the liquid crystal element 100 further includes at least one second circumferential direction lead wire 32. In the first embodiment, the liquid crystal element 100 includes a plurality of second circumferential direction lead wires 32. Note that the first circumferential direction lead wires 31 are omitted from FIG. 2 in order to simplify the drawing.

The second circumferential direction lead wires 32 extend in the circumferential direction CD. The second circumferential direction lead wires 32 each are substantially arc-shaped. One ends 32x of the second circumferential direction lead wires 32 are connected to ends of the respective second radial direction lead wires 22 in the radial direction RD. Other ends 32y of the second circumferential direction lead wires 32 are connected to the second power source 400. The second power source 400 applies the second voltage V2 to the second circumferential direction lead wires 32. As such, the second voltage V2 is applied to the second radial direction lead wires 22 via the respective second circumferential direction lead wires 32.

The second circumferential direction lead wires 32 have a resistance per unit length lower than the resistance per unit length of the second arcuate electrodes 2. Therefore, voltage drop in the second circumferential direction lead wires 32 can be inhibited in the first embodiment.

For example, the second circumferential direction lead wires 32 have an electrical resistivity lower than the electrical resistivity of the second arcuate electrodes 2. For example, the second circumferential direction lead wires 32 have a width in the radial direction RD narrower than the width of the second arcuate electrodes 2 in the radial direction RD. For example, the second circumferential direction lead wires 32 have a resistance lower than the resistance of the second arcuate electrodes 2.

Preferably, the liquid crystal element 100 further includes at least one second annular electrode C2. In the first embodiment, the liquid crystal element 100 includes a plurality of second annular electrodes C2. The second annular electrodes C2 are arranged substantially concentrically about the optical axis AX. In other words, the optical axis AX matches the axis of rotational symmetry of a substantially concentric electrode pattern. Note that the first annular electrodes C1 are omitted from FIG. 2 in order to simplify the drawing.

The second annular electrodes C2 each have a substantially ring shape that is partially broken. The second annular electrodes C2 are separate from each other in the radial direction RD. One end 2x and another end 2y of each second annular electrode C2 are separate from each other in the circumferential direction CD. The one ends 2x of the second annular electrodes C2 are connected to the corresponding second radial direction lead wires 22. The second voltage V2 is applied to the second annular electrodes C2 via the second radial direction lead wires 22.

Preferably, the liquid crystal element 100 further includes a center electrode CT that is substantially ring-shaped. Specifically, the center electrode CT has a substantially ring shape that is partially broken. The center electrode CT surrounds the core electrode CR. The second annular electrodes C2 and the second arcuate electrodes 2 are arranged outside of the center electrode CT in the radial direction RD. The center electrode CT is connected to one end of one of the second radial direction lead wires 22. The second voltage V2 is applied to the center electrode CT via the second radial direction lead wire 22.

The liquid crystal element 100 will be described with further reference to FIG. 2. The center electrode CT, the second annular electrodes C2, and the second arcuate electrodes 2 are arranged in the electrode placement area 11.

The second annular electrodes C2 are arranged in the circular area 111 of the electrode placement area 11. As such, in the liquid crystal element 100 of the first embodiment, the second annular electrodes C2 are arranged inward in the radial direction RD without being divided. In the above configuration, the wiring layout is simplified to facilitate formation of the second annular electrodes C2. In addition, the lengths of the second annular electrodes C2 located inward in the radial direction RD in the liquid crystal element 100 are relatively short. Accordingly, voltage drop can be inhibited from occurring between the one end 2x and the other end 2y of each second annular electrode C2.

At least one of the second arcuate electrodes 2 is disposed in each of the arcuate band-shaped areas 133 of the electrode placement area 11. In the first embodiment, two or more second arcuate electrodes 2 are disposed in each of the arcuate band-shaped areas 113.

In the first embodiment, each of the annular band-shaped areas 12 of the electrode placement area 11 is divided to define the arcuate band-shaped areas 113 in each of the annular band-shaped areas 12, and a second arcuate electrode 2 is disposed in each of the arcuate band-shaped areas 113. As such, the second arcuate electrodes 2 arranged side by side in the circumferential direction CD can be easily formed in each of the annular band-shaped areas 12.

Furthermore, in the first embodiment, the number of the second arcuate electrodes 2 constituting the second electrodes 42 included in the annular band-shaped areas 12b located outward in the radial direction RD is larger than the number of the second arcuate electrodes 2 constituting the second electrodes 42 included in the annular band-shaped areas 12a located inward in the radial direction RD in the liquid crystal element 100. Accordingly, even in a configuration in which the circumferential length of a second electrode 42 disposed outward in the radial direction RD in the liquid crystal element 100 may be lengthy, the length of each second arcuate electrode 2 constituting the corresponding second electrodes 42 is relatively short. As a result, voltage drop can be in habited from occurring between the one end 2a and the other end 2b of even a second arcuate electrode 2 located outward in the radial direction RD.

Here, the second radial direction lead wires 22a to 22d are connected to the one ends 2a of the respective second arcuate electrodes 2 in the arcuate band-shaped areas 113a to 113d included in the annular band-shaped areas 12b as illustrated in FIG. 2. That is, a plurality of second radial direction lead wires 22 are disposed in each of the arcuate band-shaped areas 113 in the annular band-shaped areas 12.

Furthermore, the second radial direction lead wires 22e are connected to the center electrode CT, the one ends 2x of second annular electrodes C2 in the circular area 111, and the one ends 2a of the second arcuate electrodes 2 in the arcuate band-shaped area 113b included in the annular band-shaped area 12a. The second radial direction lead wire 22f is connected to the one ends 2a of the second arcuate electrodes 2 in the arcuate band-shaped area 113b included in the annular band-shaped area 12a.

Moreover, the ends of the second radial direction lead wires 22a, 22c, 22d, and 22f in the radial direction RD are respectively connected to the one ends 32x of the second circumferential direction lead wires 32a, 32c, 32d, and 32f.

As described with reference to FIGS. 1 and 2, the liquid crystal element 100 in the first embodiment includes first arcuate electrodes 1 and second arcuate electrodes 2 that are arranged concentrically. Accordingly, voltage drop can be inhibited from occurring between the one end 1a and the other end 1b of each first arcuate electrode 1 when the first voltage V1 is applied to the one end 1a of each first arcuate electrode 1. In addition, voltage drop can be inhibited from occurring between the one end 2a and the other end 2b of each second arcuate electrode 2 when the second voltage V2 is applied to the one end 2a of each second arcuate electrode 2. Accordingly, application of the first voltage V1 and the second voltage V2 can drive the liquid crystal element 100 uniformly across the entirety thereof. As a result, liquid crystal element 100h can achieve highly accurate light refraction or highly accurate light divergence and reduction of various aberrations. Thus, the liquid crystal element 100 can be allowed to function as a high-precision liquid crystal lens.

That is, the electrode placement area 11 is divided into a plurality of areas in the first embodiment to relatively shorten each electrode. As a result, voltage drop can be inhibited from occurring between one end and the other end of each electrode.

Specifically, the electrode placement area 11 includes the annular band-shaped areas 12 divided into a plurality of arcuate band-shaped areas 113. As such, voltage drop can be inhibited from occurring between the one end 1a and the other end 1b of each first arcuate electrode 1, and voltage drop can be inhibited from occurring between the one end 2a and the other end 2b of each second arcuate electrode 2. In addition, the first annular electrodes C1 in the circular area 111 of the electrode placement area 11 are relatively short in length. Therefore, voltage drop can be inhibited from occurring between the one end 1x and the other end 1y of each annular electrodes C1. As a result, application of the first voltage V1 and the second voltage V2 can drive the liquid crystal element 100 uniformly across the entirety thereof.

Here, the electrode placement area 11 includes two annular band-shaped areas 12 in the first embodiment described with reference to FIGS. 1 and 2. However, the electrode placement area 11 may include three or more annular band-shaped areas 12 arranged side by side in the radial direction RD. Also, the number of the arcuate band-shaped areas 113 included in each annular band-shaped area 12 is not limited to 2 or 4 and may be 3 or 5 or more. Moreover, no particular limitations are placed on assignment of the first radial direction lead wires 21 and the second radial direction lead wires 22 to the arcuate band-shaped areas 113 and the first radial direction lead wires 21 and the second radial direction lead wires 22 may be assigned to any of the arcuate band-shaped areas 113. Alternatively, a dedicated first radial direction lead wire 21 and a dedicated second radial direction lead wire 22 may be assigned to the circular area 111. A plurality of arcuate band-shaped areas 113 may share a first radial direction lead wire 21 and a second radial direction lead wire 22. For example, a plurality of arcuate band-shaped areas 113 arranged side by side in the radial direction RD may share a first radial direction lead wire 21 and a second radial direction lead wire 22. The arcuate band-shaped areas 113 and the circular area 111 may share a first radial direction lead wire 21 and a second radial direction lead wire 22.

Furthermore, no particular limitations are placed on the number of the first arcuate electrodes 1 and the number of the second arcuate electrodes 2 disposed in each of the arcuate band-shaped areas 113, and they may be 1 or 2 or more. Yet, no particular limitations are placed on the number of the first annular electrodes C1 and the number of the second annular electrodes C2 disposed in the circular area 111, and they may be 1 or 2 or more.

Note that in the example illustrated in FIGS. 1 and 2, the first arcuate electrodes 1 have a central angle of approximately 180 degrees or approximately 90 degrees and the second arcuate electrodes 2 have a central angle of approximately 180 degrees or approximately 90 degrees.

Figure 3:
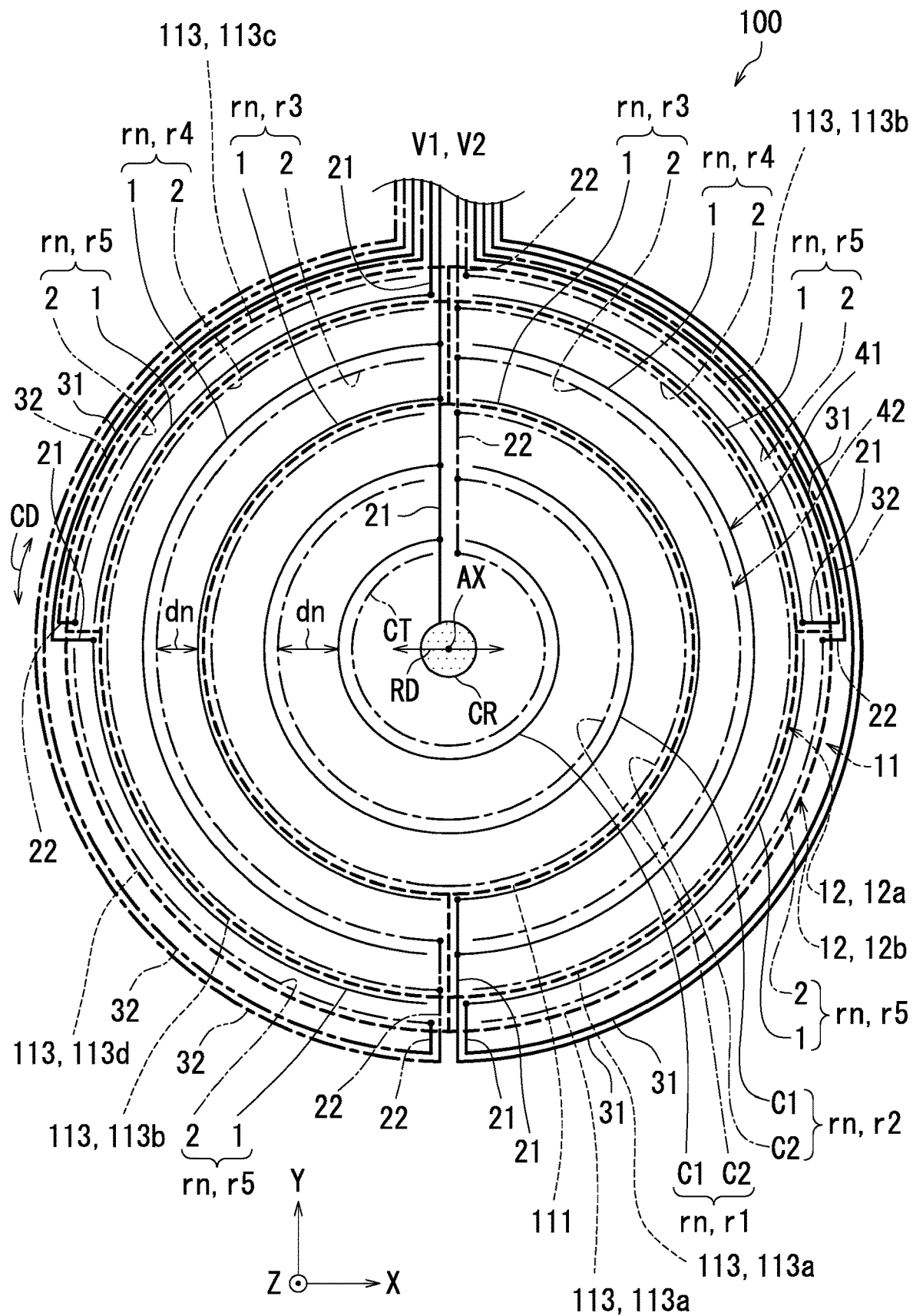
FIG. 3 is a plan view of an example of the liquid crystal element according to the first embodiment.

An example of the liquid crystal element 100 will be described next with reference to FIG. 3. FIG. 3 is a plan view of an example of the liquid crystal element 100. Note that the liquid crystal layer LQ, the first power source 300, and the second power source 400 are omitted from FIG. 3 in order to simplify the drawing.

As illustrated in FIG. 3, the core electrode CR, the center electrode CT, two first annular electrodes C1, and two second annular electrodes C2 are arranged in the circular area 111 of the liquid crystal element 100. The first annular electrodes C1 and the second annular electrodes C2 are alternately arranged in the radial direction RD. The center electrode CT is disposed inside of the first annular electrodes C1 and the second annular electrodes C2 in the radial direction RD.

In the circular area 111, a first annular electrode C1 and a second annular electrode C2 adjacent to each other in the radial direction RD constitute a unit electrode rn. In this case, for example, the unit electrode rn is composed of a first annular electrode C1 and a second annular electrode C2 adjacent to each other in the radial direction RD. In each of the unit electrodes rn, the first annular electrode C1 is disposed inside of the corresponding second annular electrode C2 in the radial direction RD.

Furthermore, the electrode placement area 11 includes two annular band-shaped areas 12a and 12b in the liquid crystal element 100. The annular band-shaped area 12a includes two arcuate band-shaped areas 113a and 113b. Two first arcuate electrodes 1 arranged side by side in the radial direction RD and two second arcuate electrodes 2 arranged side by side in the radial direction RD are arranged in the arcuate band-shaped area 113a. Also, in the arcuate band-shaped area 113b, two first arcuate electrodes 1 and two second arcuate electrodes 2 are arranged in a similar manner.

The annular band-shaped area 12b includes four arcuate band-shaped areas 113a to 113d. One first arcuate electrode 1 and one second arcuate electrode 2 are disposed in the arcuate band-shaped area 113a. In each of the arcuate band-shaped areas 113b to 113d, one first arcuate electrode 1 and one second arcuate electrode 2 are disposed in a similar manner.

The first arcuate electrodes 1 and the second arcuate electrode 2 are alternately arranged in the radial direction RD.

In each of the arcuate band-shaped areas 113a to 113d of the annular band-shaped areas 12a and 12b, a first arcuate electrode 1 and a second arcuate electrode 2 adjacent to each other in the radial direction RD constitute a unit electrode rn. In this case, for example, the unit electrode rn is composed of the first arcuate electrode 1 and the second arcuate electrode 2 adjacent to each other in the radial direction RD. In each of the unit electrodes rn, the first arcuate electrode 1 is located inside of the corresponding second arcuate electrode 2 in the radial direction RD.

The subscript n in the reference numeral "rn" affixed to each unit electrode rn of the circular area 111 and the annular band-shaped areas 12a and 12b represents an integer of more than or equal to 1 and less than or equal to N assigned to a corresponding one of the unit electrodes in the ascending order from a unit electrode with the smallest radius to a unit electrode with the largest radius of the unit electrodes among the unit electrodes. "N" represents the number of unit electrodes arranged side by side in the radial direction RD. Specifically, a unit electrode rn represents a unit electrode located the n-th from the optical axis AX among the N unit electrodes arranged side by side in the radial direction RD. In the example indicated in FIG. 3, "N" is "5". As such, 5 unit electrodes r1 to r5 are arranged side by side in the radial direction RD.

Note that the same subscript n is assigned to unit electrodes arranged on the same circumference side by side in the circumferential direction CD. For example, four unit electrodes r5 are arranged side by side in the circumferential direction CD on the same circumference in the annular band-shaped area 12b. Furthermore, the subscript n are assigned serially without distinguishing between the unit electrodes rn each composed of a first annular electrode C1 and a second annular electrode C2 and the unit electrodes rn each composed of a first arcuate electrode 1 and a second arcuate electrode 2.

The first circumferential direction lead wires 31 and the second circumferential direction lead wires 32 are arranged outside of the annular band-shaped areas 12a and 12b in the radial direction RD. In other words, the first circumferential direction lead wires 31 and the second circumferential direction lead wires 32 are arranged outside of the first arcuate electrodes 1 and the second arcuate electrodes 2 in the radial direction RD. In further other words, the first circumferential direction lead wires 31 and the second circumferential direction lead wires 32 are arranged outside of the unit electrodes rn in the radial direction RD.

As described with reference to FIG. 3, the core electrode CR, the center electrode CT, the first annular electrodes C1, the second annular electrodes C2, the first arcuate electrodes 1, and the second arcuate electrodes 2 are arranged substantially concentrically about the optical axis AX. In other words, the optical axis AX matches the axis of rotational symmetry of a substantially concentric electrode pattern.

Note that the first arcuate electrodes 1 and the second arcuate electrodes 2 are arranged outside of the core electrode CR, the center electrode CT, the first annular electrodes C1, and the second annular electrodes C2 in the radial direction RD.

Figure 4:
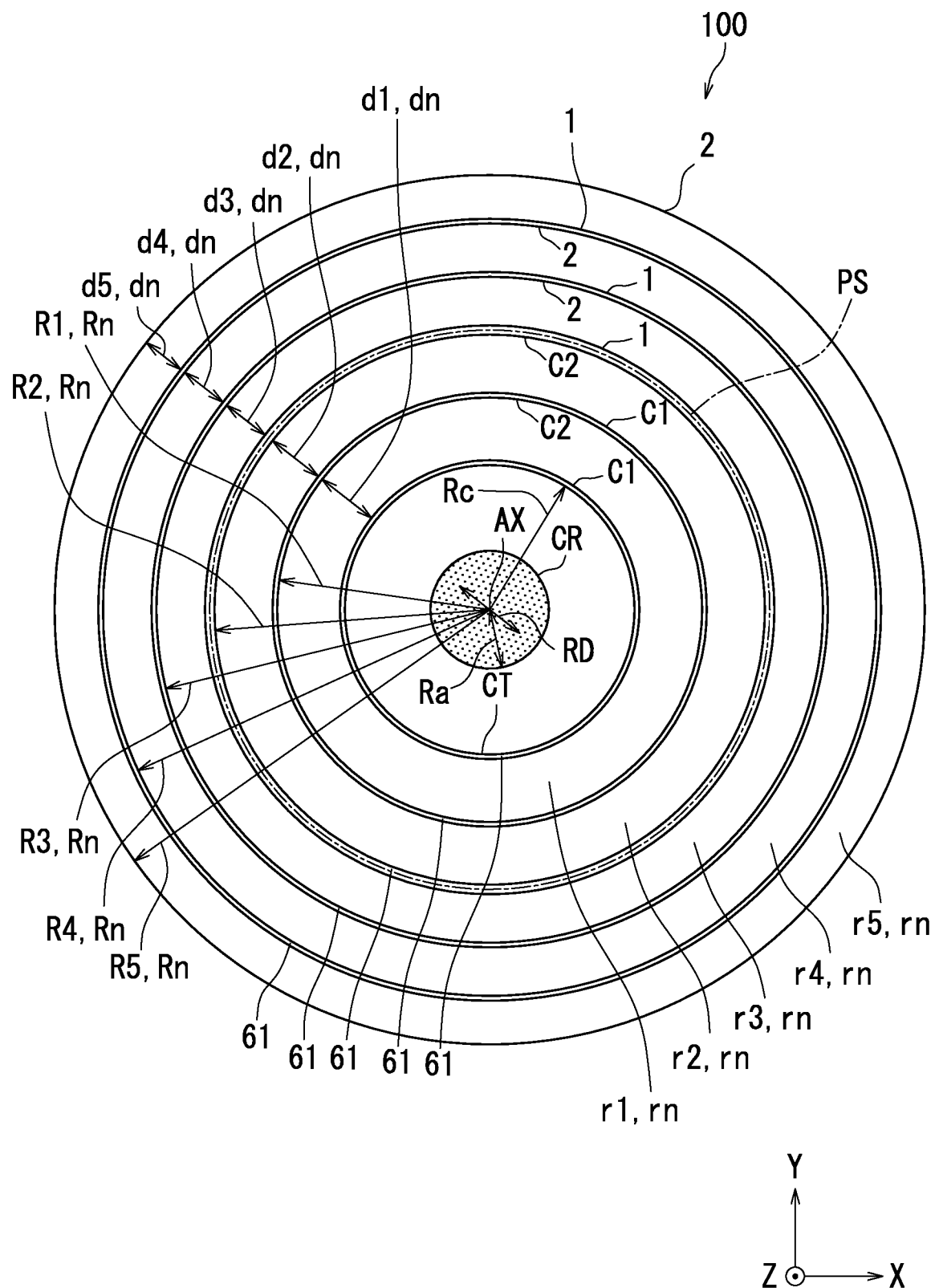
FIG. 4 is a schematic plan view of unit electrodes of the liquid crystal element according to the first embodiment.

The liquid crystal element 100 will be described next with reference to FIG. 4. FIG. 4 is a schematic plan view of the unit electrodes rn illustrated in FIG. 3. Note that unit electrodes rn that are located on the same circumference each are indicated in the form of a "ring-shaped band (annular band)" in order to simplify the drawing. Also, the first radial direction lead wires 21, the second radial direction lead wires 22, the first circumferential direction lead wires 31, the second circumferential direction lead wires 32, and the liquid crystal layer LQ are omitted from FIG. 4.

As illustrated in FIG. 4, the unit electrodes rn have respective widths dn. The subscript n in the reference numeral "dn" corresponds to the subscript n in the reference numeral "rn". In the liquid crystal element 100, a unit electrode rn located more outward in the radial direction RD has a narrower width dn (d5<d4<d3<d2<d1). The width dn represents a width of the unit electrode rn in the radial direction RD. Specifically, as illustrated in FIG. 3, the width dn is a distance in the radial direction RD between a first annular electrode C1 and a second annular electrode C2 constituting a unit electrode rn, or a distance in the radial direction RD between a first arcuate electrode 1 and a second arcuate electrode 2 constituting a unit electrode rn.

As illustrated in FIG. 4, the core electrode CR has a radius Ra. The center electrode CT has a radius Rc. The radius Rc is larger than the radius Ra.

The unit electrodes rn have respective radii Rn. The subscript n in the reference numeral "Rn" corresponds to the subscript n in the reference numeral "rn". In the liquid crystal element 100, a unit electrode rn located more outward in the radial direction RD has a larger radius Rn (R5>R4>R3>R2>R1). The radii Rn of the unit electrodes rn are larger than the radius Rc of the center electrode CT. In the first embodiment, the radius Rn indicates a distance from the optical axis AX to the second arcuate electrode 2 constituting a corresponding unit electrode rn.

A radius Un represented by formula (1) and formula (2) may be used as the radius Rn of a unit electrode rn. Therefore, the layout of the unit electrodes rn can be easily designed using a simple formula such as formula (1) in the first embodiment.

[Formula 2]

$$Sn - 0.1 \times Sn \leq Un \leq Sn + 0.1 \times Sn \quad (1)$$

$$Sn = (n+1)^{\frac{1}{2}} \times Sc \quad (2)$$

Formula (2) includes a radius Sc of the center electrode CTS and expresses a radius Sn of a unit electrode sn located the n-th from the optical axis AX among N unit electrodes sn arranged side by side in the radial direction RD. The configuration of the center electrode CTS is the same as the configuration of the center electrode CT. The configuration of the unit electrodes sn is the same as the configuration of the unit electrodes rn. The subscript n in the reference numeral "sn" for the unit electrodes sn is the same as the subscript n in the reference numeral "rn" for the unit electrodes rn. The subscript n in the reference numeral "Un" for the radius Un in formula (1) corresponds to the subscript n in the reference numeral "Sn" for the radius Sn in formula (2).

However, of the unit electrodes rn, the unit electrodes rn located outside of a specific location PS (dashed and dotted line) in the radial direction RD preferably have radii Rn smaller than the radius Un expressed by formula (1). In this preferable example, the unit electrodes rn located outside of the specific location PS in the radial direction RD have widths do narrower than a width of the unit electrode defined by the radius Un expressed by formula (1). Therefore, an amplitude difference of retardation in the radial direction RD can be inhibited from attenuating in a liquid crystal portion of the liquid crystal layer LQ driven by unit electrodes rn located outside of the specific location PS in the radial direction RD. By contrast, in a liquid crystal portion of the liquid crystal layer LQ driven by unit electrodes rn located inside of the specific location PS in the radial direction RD, the widths dn of the unit electrodes rn are relatively large. Therefore, attenuation of the amplitude difference of retardation in the radial direction RD does not occur or hardly occurs.

Therefore, in the first embodiment, amplitude difference of retardation in the radial direction RD can be in inhibited from attenuating in the crystal portion of the liquid crystal layer LQ driven by the unit electrodes rn located outside of the specific location PS in the radial direction RD, thereby ensuring a sufficient amplitude difference of retardation in the radial direction RD for each unit electrode rn across the entirety of the liquid crystal layer LQ. As a result, wave aberration of the liquid crystal element 100 functioning as a liquid crystal lens can be effectively reduced.

That is, the widths dn of the unit electrodes rn can be determined so that the amplitude difference of retardation is substantially uniform in a plurality of liquid crystal portions of the liquid crystal layer LQ corresponding to the respective unit electrodes rn from the inside to the outside of thereof in the radial direction RD.

Here, the term retardation means an amount indicating a phase difference between two waves in a phenomenon in which light incident on the liquid crystal layer LQ is split into the two light waves in mutually perpendicular oscillation directions. The retardation is represented by R=Δn×d. R represents a retardation, Δn represents a birefringence of the liquid crystal layer LQ, and d represents a thickness of the liquid crystal layer LQ.

Even in a liquid crystal layer LQ with a uniform thickness d, the retardation is uneven depending on the state of each liquid crystal molecule. That is, it is not true that there exist in the liquid crystal layer LQ only liquid crystal molecules oriented in a direction perpendicular to the optical axis AX and liquid crystal molecules oriented in a direction parallel to the optical axis AX in application of the first voltage V1 and the second voltage V2. In other words, in application of the first voltage V1 and the second voltage V2, orientation of the liquid crystal molecules continuously varies in the liquid crystal layer LQ due to continuity of the liquid crystal molecules. Therefore, due to dependency thereof on the state of each liquid crystal molecule, the retardation also changes even in a liquid crystal layer LQ with a uniform thickness d.

Figure 5:
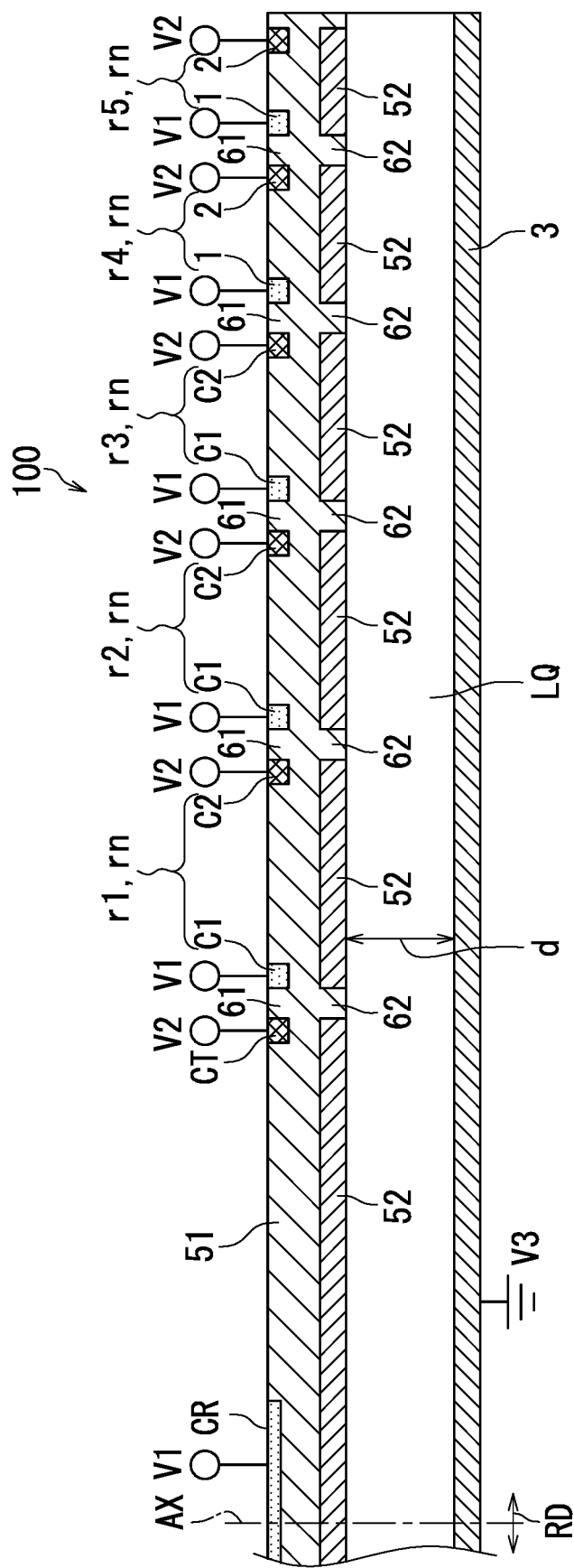
FIG. 5 is a cross-sectional view of the liquid crystal element according to the first embodiment.

The liquid crystal element 100 illustrated in FIG. 3 will be described next with reference to FIG. 5. FIG. 5 is a cross-sectional view of the liquid crystal element 100 illustrated in FIG. 3. As illustrated in FIG. 5, the liquid crystal element 100 further includes a plurality of insulating layers 51, a plurality of first boundary layers 61, a plurality of second boundary layers 62, a plurality of high-resistance layers 52

(a plurality of resistance layers), and an electrode 3 in addition to the core electrode CR, the center electrode CT, the unit electrodes rn, and the liquid crystal layer LQ.

The core electrode CR, the center electrode CT, and the unit electrodes rn are arranged at the same layer level. For example, the core electrode CR, the center electrode CT, and the unit electrodes rn are made of for example indium tin oxide (ITO), and are transparent.

The center electrode CT is adjacent to a unit electrode r1 with a first boundary layer 61 therebetween. Mutually adjacent unit electrodes rn are adjacent to each other with a first boundary layer 61 therebetween. The first boundary layers 61 each include an electric insulator and are made of the same material as the insulating layers 51 in the first embodiment. The first boundary layers 61 are transparent, for example.

An insulating layer 51 is arranged between the core electrode CR, the center electrode CT, and a high-resistance layer 52. Further, an insulating layer 51 is arranged between each unit electrode rn and a corresponding one of the high-resistance layers 52. An insulating layer 51 is arranged between a first annular electrode C1 and a second annular electrode C2 or between a first arcuate electrode 1 and a second arcuate electrode 2 in each unit electrode rn. The insulating layers 51 are transparent, for example. The insulating layers 51 are electric insulators. The electric insulators are made of silicon dioxide, for example.

The high-resistance layers 52 and the second boundary layers 62 are arranged at the same layer level. Of the high-resistance layers 52, the innermost high-resistance layer 52 is opposite to the core electrode CR and the center electrode CT with an insulating layer 51 therebetween. The other high-resistance layers 52 each are opposite to a corresponding one of the unit electrodes rn with an insulating layer 51 therebetween. The high-resistance layers 52 each are arranged between a corresponding one of the insulating layers 51 and the liquid crystal layer LQ. The high-resistance layers 52 have an electrical resistivity higher than each of the electrical resistivity of the core electrode CR, the electrical resistivity of the center electrode CT, and the electrical resistivity of the unit electrodes rn, and lower than the electrical resistivity of the insulating layers 51. For example, the high-resistance layers 52 are transparent and are made of zinc oxide (ZnO).

A second boundary layer 62 is located between mutually adjacent high-resistance layers 52. Each second boundary layer 62 includes an electric insulator and is made of the same material as the insulating layers 51 in the first embodiment. The second boundary layers 62 are transparent, for example. The second boundary layers 62 are opposite to the respective first boundary layers 61 with the insulating layers 51 therebetween.

The liquid crystal layer LQ is located between the core electrode CR, the center electrode CT, and the electrode 3. Furthermore, the liquid crystal layer LQ is located between the unit electrodes rn and the electrode 3. Specifically, the liquid crystal layer LQ is located between the high-resistance layers 52 and the electrode 3.

A third voltage V3 is applied to the electrode 3. In the first embodiment, the electrode 3 is grounded and the third voltage V3 is set to the grounding potential (0 V). The electrode 3 is a planer in shape and is formed as a single layer. The electrode 3 is disposed opposite to the core electrode CR, the center electrode CT, and the unit electrodes rn with the liquid crystal layer LQ, the high-resistance layers 52, and the insulating layers 51 therebetween. The electrode 3 is made of ITO, for example, and is transparent.

Note that the sectional structure of the liquid crystal element 100 illustrated in FIG. 5 is one example and is not limited. For example, the liquid crystal element 100 may include no high-resistance layers 52. Alternatively or additionally, the liquid crystal element 100 may not include the core electrode CR. Furthermore, although not illustrated for the sake of simplification of the drawings, the liquid crystal element 100 includes at least one alignment layer (e.g., an alignment film). The alignment layer aligns the liquid crystal molecules of the liquid crystal layer LQ. The alignment layer is located for example between the high-resistance layers 52 and the liquid crystal layer LQ and/or between the liquid crystal layer LQ and the electrode 3.

As has been described with reference to FIGS. 1 to 5, the first voltage V1 is applied to the core electrode CR, the second voltage V2 is applied to the center electrode CT, and the first voltage V1 and the second voltage V2 are applied to the unit electrodes rn in the first embodiment. As such, a saw-tooth potential gradient symmetrical with respect to the optical axis AX can be formed in the liquid crystal layer LQ. As a result, the liquid crystal element 100 can be allowed to function as a Fresnel lens.

In particular, when the maximum amplitude or the effective value of the second voltage V2 is set larger than the maximum amplitude or the effective value of the first voltage V1, a convex Fresnel lens can be formed by the liquid crystal element 100. By contrast, when the maximum amplitude or the effective value of the second voltage V2 is set smaller than the maximum amplitude or the effective value of the first voltage V1, a concave Fresnel lens can be formed by the liquid crystal element 100.

Second Embodiment

Figure 6:
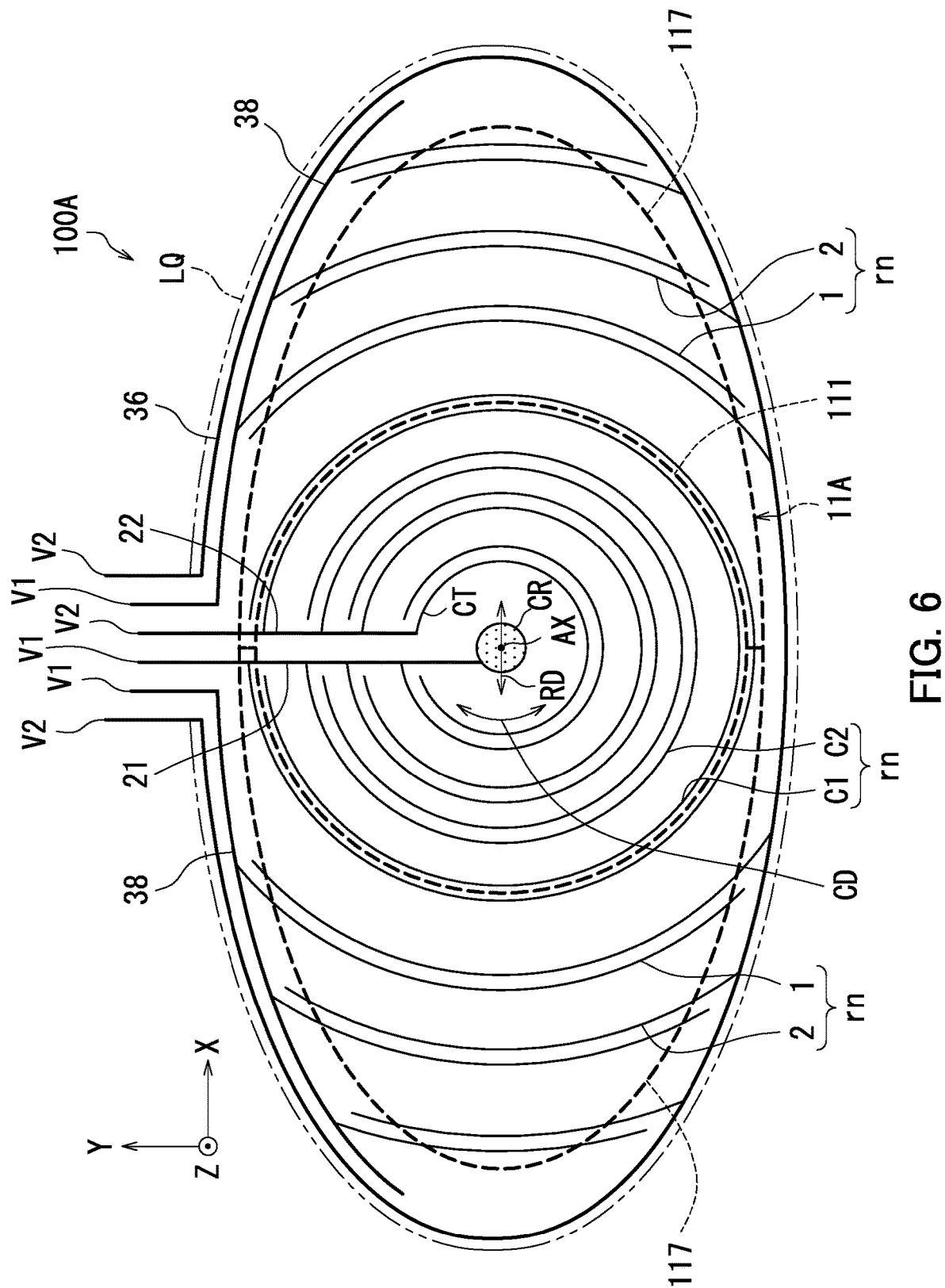
FIG. 6 is a plan view of a liquid crystal element according to a second embodiment of the present invention.

The following describes a liquid crystal element 100A according to a second embodiment of the present invention with reference to FIG. 6. The second embodiment mainly differs from the first embodiment in that the liquid crystal element 100A has an electrode placement area 11A that is substantially elliptical in shape.

Differences of the second embodiment from the first embodiment are mainly described below.

FIG. 6 is a plan view of the liquid crystal element 100A according to the second embodiment. As illustrated in FIG. 6, the liquid crystal element 100A includes a liquid crystal layer LQ, a core electrode CR, a center electrode CT, a plurality of first annular electrodes C1, a plurality of second annular electrodes C2, a plurality of first arcuate electrodes 1, a plurality of second arcuate electrodes 2, a first radial direction lead wire 21, a second radial direction lead wire 22, an elliptical lead wire 36, and a pair of curved lead wires 38.

The first arcuate electrodes 1 are disposed outside of the first annular electrodes C1 and the second annular electrodes C2 in the radial direction RD to the optical axis AX. The second arcuate electrodes 2 are disposed outside of the first annular electrodes C1 and the second annular electrodes C2 in the radial direction RD to the optical axis AX.

That is, electrodes located outside of the first annular electrodes C1 and the second annular electrodes C2 are the first arcuate electrodes 1 and the second arcuate electrodes 2 each are substantially arc-shaped. As such, voltage drop in the first arcuate electrodes 1 and the second arcuate electrodes 2 can be inhibited when compared with a configuration in which electrodes located outside of the first annular electrodes C1 and the second annular electrodes C2 are circular in shape. As a result, uniform drive of the liquid crystal element 100A across the entirety thereof can be achieved in application of the first voltage V1 and the second voltage V2.

Furthermore, in the second embodiment, the core electrode CR, the center electrode CT, the first annular electrodes C1, the second annular electrodes C2, the first arcuate electrodes 1, and the second arcuate electrodes 2 are arranged substantially concentrically about the optical axis AX. For example, the first arcuate electrodes 1 are disposed on concentric circles and the second arcuate electrodes 2 are disposed on concentric circuits. As such, the first arcuate electrodes 1 and the second arcuate electrodes 2 are disposed concentrically. Note that the optical axis AX in the second embodiment 2 matches a rotational symmetry axis of a substantially concentric electrode pattern like in the first embodiment.

Further, the liquid crystal element 100A has an electrode placement area 11A. The electrode placement area 11A is substantially elliptical in shape. The electrode placement area 11A includes a circular area 111 and a plurality of non-circular areas 117. In the second embodiment, the electrode placement area 11A includes a pair of non-circular areas 117. Note that the electrode placement area 11A may include a single non-circular area 117.

The first annular electrodes C1 and the second annular electrodes C2 are disposed in the circular area 111.

The non-circular areas 117 each have a shape that differs from a circle. Furthermore, a boundary part of the non-circular areas 117 between the circular area 111 and each non-circular area 117 is substantially arc-shaped.

At least one first arcuate electrode 1 and at least one second arcuate electrode 2 are disposed in each of the non-circular areas 117. In the second embodiment, a plurality of first arcuate electrodes 1 and a plurality of second arcuate electrodes 2 are disposed in each of the non-circular areas 117. Furthermore, the paired non-circular areas 117 are symmetric with respect to the optical axis AX. The shape of the paired non-circular areas 117 is defined so that the paired non-circular areas 117 and the circular area 111 form a substantially elliptical shape. Note that a first arcuate electrode 1 located more outward in the radial direction RD among the first arcuate electrodes 1 has a larger radius of curvature, for example. Also, a second arcuate electrode 2 located more outward in the radial direction RD among the second arcuate electrodes 2 has a larger radius of curvature, for example.

In each of the non-circular areas 117, a first arcuate electrode 1 located more outward in the radial direction RD has a shorter length in the circumferential direction CD. Also, in each of the non-circular areas 117, a second arcuate electrode 2 located more outward in the radial direction RD has a shorter length in the circumferential direction CD.

In the second embodiment, as a result of the electrode placement area 11 including the non-circular area 117, formation of the non-circular liquid crystal element 100A can be facilitated. In particular, the liquid crystal element 100A can be favorably used as a lens for eyeglasses because the liquid crystal element 100A can be formed substantially in an elliptical shape in the second embodiment.

The elliptical lead wire 36 has a substantially elliptical shape and surrounds the circular area 111 and the pair of non-circular areas 117. That is, the elliptical lead wire 36 surrounds the first annular electrodes C1, the second annular electrodes C2, the first arcuate electrodes 1, and the second arcuate electrodes 2. The second voltage V2 is applied to the elliptical lead wire 36. The elliptical lead wire 36 then applies the second voltage V2 to the second arcuate electrodes 2.

The elliptical lead wire 36 has a resistance per unit length lower than the resistance per unit length of the second arcuate electrodes 2. Therefore, voltage drop in the elliptical lead wire 36 can be inhibited in the second embodiment. Specific examples relating to the resistance of the elliptical lead wire 36 are the same as the specific examples for the second circumferential direction lead wires 32 in the first embodiment.

The paired curved lead wires 38 each have a substantially curved shape and are disposed inside of the elliptical lead wire 36. Each of the paired curved lead wires 38 extends along the elliptical lead wire 36. The paired curved lead wires 38 correspond to the respective paired non-circular areas 117. The first voltage V1 is applied to the paired curved lead wires 38. The curved lead wires 38 then apply the first voltage V1 to the first arcuate electrodes 1 in the corresponding non-circular areas 117.

The curved lead wires 38 has a resistance per unit length lower than the resistance per unit length of the first arcuate electrodes 1. Therefore, voltage drop in the curved lead wires 38 can be inhibited in the second embodiment. Specific examples relating to the resistance of the curved lead wires 38 are the same as the specific examples for the first circumferential direction lead wires 31 in the first embodiment.

Note that it is possible that the elliptical lead wire 36 applies the first voltage V1 to the first arcuate electrodes 1 and the curved lead wire 38 applies the second voltage V2 to the second arcuate electrodes 2. Furthermore, no particular limitations are placed on the number of the first arcuate electrodes 1 and the number of the second arcuate electrodes 2 that are disposed in each of the non-circular areas 117, and they may be 1 or 2 or more. Furthermore, no particular limitations are placed on the number of the first annular electrodes C1 and the number of the second annular electrodes C2 that are disposed in the circular area 111, and they may be 1 or 2 or more.

Either or both the elliptical lead wire 36 and the curved lead wires 38 may be set within an eyeglass frame that does not transmit light, for example. Furthermore, the shape of either or both the elliptical lead wire 36 and the curved lead wires 38 is not necessarily the same as the shape of the eyeglass frame. However, when it is the same as the shape of the eyeglass frame, an effective lens area in the area of the eyeglass frame can be utilized to maximum.

Figure 7:
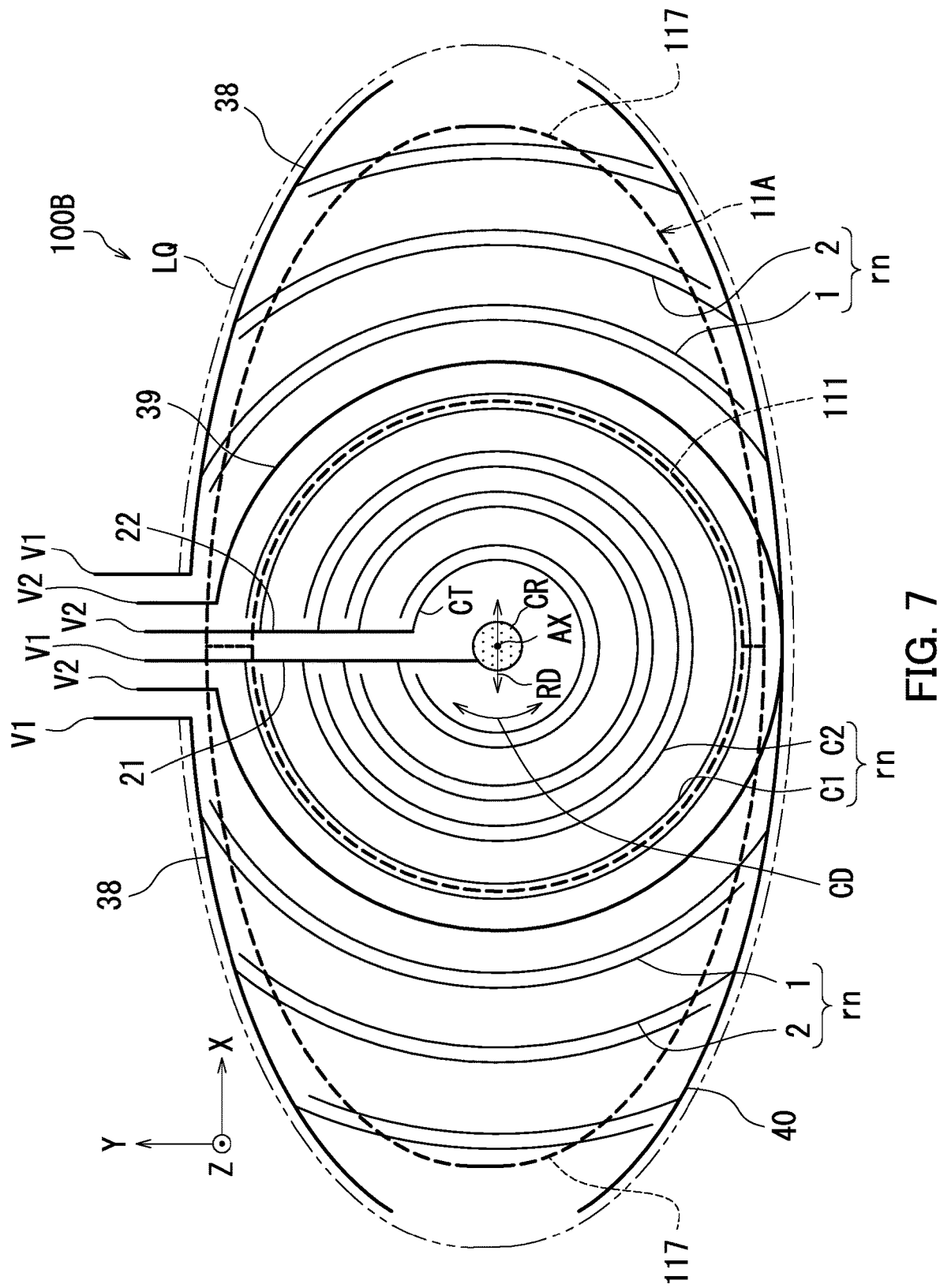
FIG. 7 is a plan view of a liquid crystal element according to a variation of the second embodiment.

(Variation) The following describes a liquid crystal element 100B according to a variation of the second embodiment of the present invention with reference to FIG. 7. The variation mainly differs from the second embodiment described with reference to FIG. 6 in application of the second voltage V2 via a circular lead wire 39 and a curved lead wire 40. Differences of the variation from the second embodiment are mainly described below.

FIG. 7 is a plan view of the liquid crystal element 100B according to the variation of the second embodiment. As illustrated in FIG. 7, the liquid crystal element 100B includes a circular lead wire 39 and a curved lead wire 40 instead of the elliptical lead wire 36 of the liquid crystal element 100A in FIG. 6.

The circular lead wire 39 has a substantially circular shape. The circular lead wire 39 surrounds the first annular electrodes C1 and the second annular electrodes C2. The circular lead wire 39 is connected to the curved lead wire 40. The second voltage V2 is applied to the circular lead wire 39. The circular lead wire 39 applies the second voltage V2 to the curved lead wire 40. The curved lead wire 40 then applies the second voltage V2 to the second arcuate electrodes 2.

Each resistance per unit length of the circular lead wire 39 and the curved lead wire 40 is lower than the resistance per unit length of the second arcuate electrodes 2. Accordingly, voltage drop in the circular lead wire 39 and the curved lead wire 40 can be inhibited in the variation. Specific examples relating to the resistance of the circular lead wire 39 and the curved lead wire 40 are the same as the specific examples for the second circumferential direction lead wires 32 in the first embodiment.

Note that it is possible that the circular lead wire 39 and the curved lead wire 40 apply the first voltage V1 to the first arcuate electrodes 1 while the curved lead wire 38 applies the second voltage V2 to the second arcuate electrodes 2.

Here, in the second embodiment and the variation described with reference to FIGS. 6 and 7, the liquid crystal element 100A and the liquid crystal element 100B may each include the core electrode CR, the center electrode CT, the first annular electrodes C1, the second annular electrodes C2, the first arcuate electrodes 1, and the second arcuate electrodes 2 included in the liquid crystal element 100 of the first embodiment described with reference to FIGS. 1 to 5 instead of the core electrode CR, the center electrode CT, the first annular electrodes C1, and the second annular electrodes disposed in the circular area 111 illustrated in FIGS. 6 and 7. That is, the liquid crystal element 100A and the liquid crystal element 100B may each have the circular area 111 and the annular band-shaped area 12 in the first embodiment instead of the circular area 111 in FIGS. 6 and 7. Note that the liquid crystal element 100A may not include the core electrode CR.

Furthermore, the liquid crystal element 100A and the liquid crystal element 100B may each include the core electrode CR, the center electrode CT, the first annular electrodes C1, the second annular electrodes C2, the first arcuate electrodes 1, the second arcuate electrodes 2, the first radial direction lead wires 21, the first circumferential direction lead wires 31, the second radial direction lead wires 22, and the second circumferential direction lead wires 32 in the liquid crystal element 100 of the first embodiment instead of the core electrode CR, the center electrode CT, the first annular electrodes C1, and the second annular electrodes disposed in the circular area 111 in FIGS. 6 and 7.

Note that no particular limitations are placed on the shape of the electrode placement area 11A although the electrode placement area 11A has a substantially elliptical shape in the second embodiment and the variation. An example of the electrode placement area 11A with a substantially elliptical shape is illustrated in FIGS. 6 and 7 as a preferable shape in a situation in which the liquid crystal element 100A is used as a lens of eyeglasses.

Furthermore, each of the non-circular areas 117 may be divided in the radial direction RD so that the non-circular areas 117 are each formed of a plurality of areas (also referred to below as "areas DV") in the second embedment and the variation. A single or a plurality of unit electrodes rn (pair(s) of a first arcuate electrode 1 and a second arcuate electrode 2) may be disposed in each of the areas DV. In this case, a unit electrode rn and a unit electrode rn adjacent to each other in the circumferential direction CD in different areas DV are separate from each other in the circumferential direction CD. Furthermore, a unit electrode rn and a unit electrode rn adjacent to each other in the radial direction RD in a single area DV are separate from each other in the radial direction RD.

Third Embodiment

The following describes a liquid crystal device 200 according to a third embodiment of the present invention with reference to FIGS. 8 to 11. The third embodiment mainly differs from the first embodiment in that a liquid crystal element 100C of the liquid crystal device 200 in the third embodiment includes a plurality of liquid crystal lens parts Bpq with different focal lengths. Differences of the third embodiment from the first embodiment are mainly described below.

Figure 8:
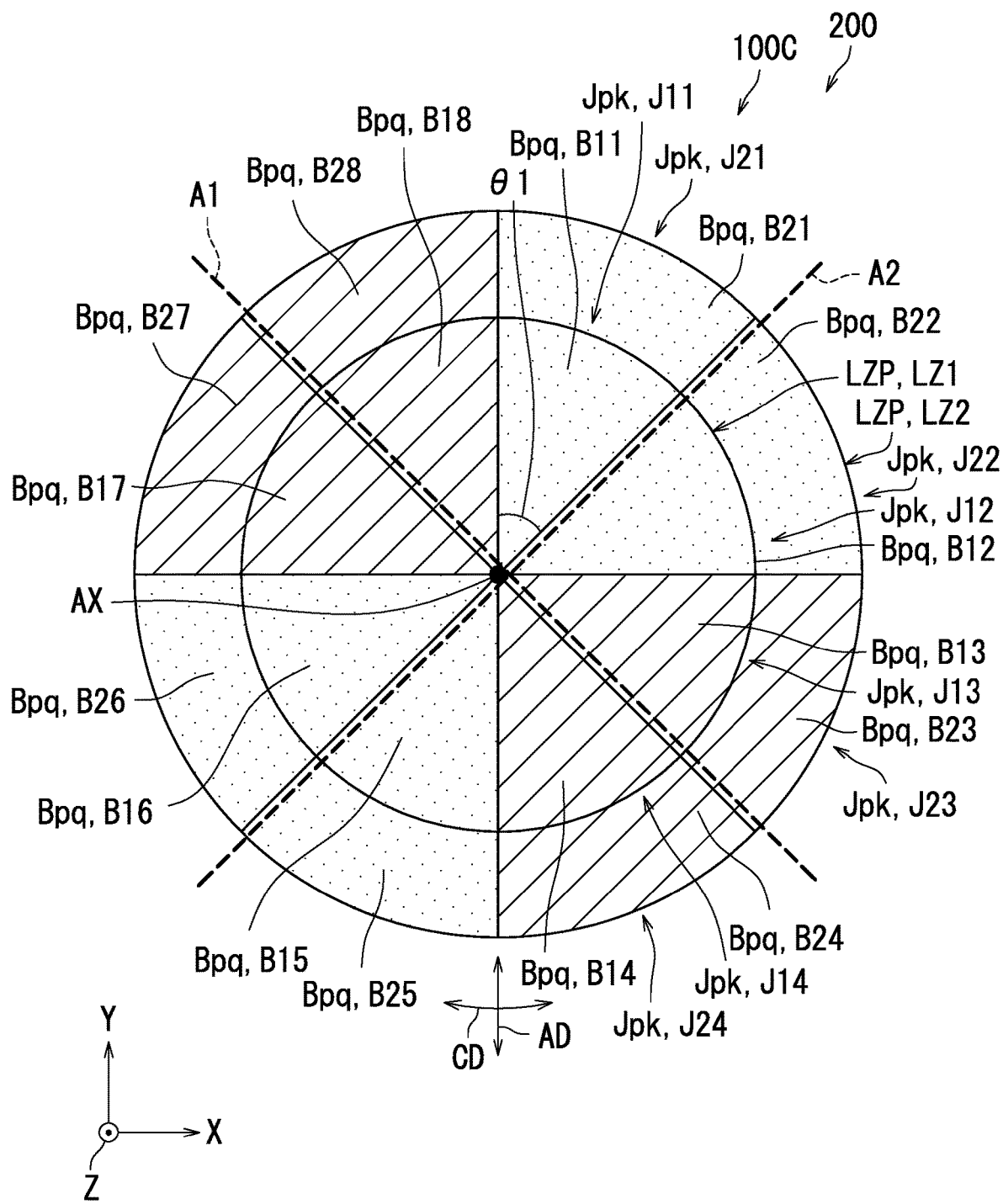
FIG. 8 is a plan view of a liquid crystal device according to a third embodiment of the present invention.

The liquid crystal device 200 will be described first with reference to FIG. 8. FIG. 8 is a plan view of the liquid crystal device 200 according to the third embodiment. As illustrated in FIG. 8, the liquid crystal device 200 include a liquid crystal element 100C. The liquid crystal element 100C has a substantially circular shape in a plan view. The plan view is a view of an object as viewed in an axial direction in parallel to the optical axis AX.

The liquid crystal element 100C functions as a liquid crystal lens. For example, the liquid crystal element 100C functions as a lens of eyeglasses or a contact lens. The liquid crystal element 100C has at least one lens area LZp. In the third embodiment, the liquid crystal element 100C has a plurality of lens areas LZp. The lens areas LZp are arranged substantially concentrically about the optical axis AX.

The subscript p in the reference numeral "LZp" indicates the number of a corresponding lens area LZp in the radial direction RD. Specifically, the subscript "p" is assigned to each lens area LZp in the ascending order toward the outside in the radial direction RD. More specifically, the subscript "p" indicates the number of partitions in the liquid crystal element 100C in the radial direction RD.

The lens areas LZp each include a plurality of liquid crystal lens part Bpq. The subscript p in the reference numeral "Bpq" indicates the number of a corresponding liquid crystal lens part Bpq in the radial direction RD. Specifically, the subscript "p" is assigned to each liquid crystal lens part LZp in the ascending order toward the outside in the radial direction RD. The subscript q in the reference numeral "Bpq" indicates the number of a corresponding liquid crystal lens part Bpq in the circumferential direction CD. Specifically, the subscript "q" is assigned to each liquid crystal lens part Bpq in the ascending order clockwise in the circumferential direction CD. More specifically, the subscript "q" indicates the number of partitions in the liquid crystal element 100C in the circumferential direction CD. That is, the subscript "q" indicates the number of partitions of a corresponding lens area LZp in the circumferential direction CD. In the example illustrated in FIG. 8, p represents 1 or 2 and q represents any of 1 to 8. In the following, p may be also referred to below as "radial direction number" and q may be also referred to below as "circumferential direction number".

A lens area LZ1 has a substantially circular shape in a plan view, for example. The optical axis AX passes through the substantial center of the lens area LZ1. The lens area LZ1 includes liquid crystal lens parts B11 to B18. The liquid crystal lens parts B11 to B18 are arranged side by side in the circumferential direction CD. The liquid crystal lens parts B11 to B18 each have a substantially fan shape in a plan view, for example. Furthermore, the liquid crystal lens parts B11 to B18 include at least two liquid crystal lens parts Bpq with different focal lengths. Accordingly, in a situation in which the liquid crystal element 100C of the third embodiment is used for an eye of a person, the focal lengths of the liquid crystal lens parts B11 to B18 can be set according to the state of corresponding parts of the eyeball.

A lens area LZ2 has a substantially annular band shape in a plan view, for example. The lens area LZ2 is located outside of the lens area LZ1 in the radial direction RD. The lens area LZ2 surrounds the lens area LZ1 in the circumferential direction CD.

The lens area LZ2 includes liquid crystal lens parts B21 to B28. The liquid crystal lens parts B21 to B28 are arranged side by side in the circumferential direction CD. The liquid crystal lens parts B21 to B28 each have a substantially arcuate band shape in a plan view, for example. Furthermore, the liquid crystal lens parts B21 to B28 include at least two liquid crystal lens parts Bpq with different focal lengths. Accordingly, in a situation in which the liquid crystal element 100C of the third embodiment is used for an eye of a person, the focal lengths of the liquid crystal lens parts B21 to B28 can be set according to the states of corresponding parts of the eyeball.

Preferably, an astigmatism is caused as a result of the at least two liquid crystal lens parts Bpq having different focal lengths. In this preferable example, the liquid crystal element 100C can be utilized as a liquid crystal lens for astigmia correction.

Of the liquid crystal lens parts Bpq, paired liquid crystal lens parts Bpq located opposite to each other in the radial direction RD with the optical axis AX therebetween have the substantially same focal length as each other. In the example illustrated in FIG. 8, paired liquid crystal lens parts B11 and B15 are opposite to each other in the radial direction RD while paired liquid crystal lens parts B12 and B16 are opposite to each other in the radial direction RD. Also, paired liquid crystal lens parts B13 and B17 are opposite to each other in the radial direction RD while paired liquid crystal lens parts B14 and B18 are opposite to each other in the radial direction RD. Further, paired liquid crystal lens parts B21 and B25 are opposite to each other in the radial direction RD while paired liquid crystal lens parts B22 and B26 are opposite to each other in the radial direction RD. In addition, paired liquid crystal lens parts B23 and B27 are opposite to each other in the radial direction RD while paired liquid crystal lens parts B24 and B28 are opposite to each other in the radial direction RD.

For example, the paired liquid crystal lens parts B11 and B15 are opposite to each other in the radial direction RD with the optical axis AX therebetween. Accordingly, a spot of light imaged at the focal point on the optical axis AX can be reduced in size. The same applies to the other pairs of liquid crystal lens parts Bpq.

The number of the liquid crystal lens parts Bpq arranged side by side in the circumferential direction CD is preferably an even number. In the example illustrated in FIG. 8, the number of the liquid crystal lens parts B11 to B18 arranged side by side in the circumferential direction CD is 8. The number of the liquid crystal lens parts B21 to B28 arranged side by side in the circumferential direction CD is 8.

The paired liquid crystal lens parts Bpq opposite to each other in the radial direction RD with the optical axis AX therebetween form a liquid crystal lens part set Jpk. The subscript p in the reference sign "Jpk" indicates the number of a corresponding liquid crystal lens part set Jpk in the radial direction RD. Specifically, the subscript "p" is assigned to each liquid crystal lens part set Jpk in the ascending order toward the outside in the radial direction RD. The subscript k in the reference sign "Jpk" indicates the number of a corresponding liquid crystal lens part set Jpk in the circumferential direction CD. Specifically, the subscript "k" is assigned to each liquid crystal lens part set Jpk in the ascending order clockwise in the circumferential direction CD. In the example illustrated in FIG. 8, p represents 1 or 2 and k represents any of 1 to 4. For example, k is q/2.

In the example illustrated in FIG. 8, the paired liquid crystal lens parts B11 and B15 form a liquid crystal lens part set J11 while the paired liquid crystal lens parts B12 and B16 form a liquid crystal lens part set J12. Also, the paired liquid crystal lens parts B13 and B17 form a liquid crystal lens part set J13 while the paired liquid crystal lens parts B14 and B18 form a liquid crystal lens part set J14. Further, the paired liquid crystal lens parts B21 and B25 form a liquid crystal lens part set J21 while the paired liquid crystal lens part B22 and B26 form a liquid crystal lens part set J22. In addition, the paired liquid crystal lens parts B23 and B27 form a liquid crystal lens part set J23 while the paired liquid crystal lens parts B24 and B28 form a liquid crystal lens part set J24.

The number of the liquid crystal lens part sets J11, J12, J13, and J14 arranged side by side in the circumferential direction CD is preferably an even number (e.g., 4). The number of the liquid crystal lens part sets J21, J22, J23, and J24 arranged side by side in the circumferential direction CD is preferably even number (e.g., 4).

In FIG. 8, the liquid crystal lens part sets Jpk that are hatched with oblique lines that incline upward and rightward have substantially the same focal length. Also, the liquid crystal lens part sets Jpk that are dotted have substantially the same focal length. The focal length of the liquid crystal lens part sets Jpk that are hatched with the oblique lines that incline upward and rightward and the focal length of the liquid crystal lens part sets Jpk that are dotted differ from each other.

That is, the liquid crystal lens part sets Jpk include at least two liquid crystal lens part sets Jpk with different focal lengths. Specifically, the focal length of the liquid crystal lens part sets J11 and J12 differs from the focal length of the liquid crystal lens part sets J13 and J14. The focal length of the liquid crystal lens part sets J21 and J22 differs from the focal length of the liquid crystal lens part sets J23 and J24.

As described so far with reference to FIG. 8, the even number of liquid crystal lens part sets Jpk include at least two liquid crystal lens part sets Jpk with different focal lengths in the third embodiment. Accordingly, a focal length corresponding to the chaotic view axis A1 of an eye can be set by the liquid crystal lens part sets J11, J21, J12, and J22 of the even number of liquid crystal lens part sets Jpk. By contrast, a focal length corresponding to the chaotic view axis A2 of the eye can be set by the liquid crystal lens part sets J13, J23, J14, and J24 of the even number of liquid crystal lens part sets Jpk. Accordingly, an astigmatism corresponding to the chaotic view axis A1 and the chaotic view axis A2 orthogonal to each other can be caused in the liquid crystal element 100C. As a result, astigmia can be effectively corrected. The chaotic view axis A1 corresponds to the edge of a sagittal plane, for example. The chaotic view axis A2 corresponds to the edge of a meridional plane, for example.

In particular, each central angle θ1 of the liquid crystal lens parts Bpq is preferably less than or equal to 90 degrees in the third embodiment. That is, each central angle θ1 of the liquid crystal lens part sets Jpk is preferably less than or equal to 90 degrees. In the above preferable example, an astigmatism can be caused in the liquid crystal element 100C according to the chaotic view axes A1 and A2 for each person without need to rotate the liquid crystal element 100C in the circumferential direction CD or while relatively reducing the rotational angle of the liquid crystal element 100C in the circumferential direction CD. Thus, astigmia can be easily corrected using the liquid crystal element 100C.

Although the chaotic view axes A1 and A2 are orthogonal to each other, the direction of the chaotic view axis A1 differs from person to person and the direction of the chaotic view axis A2 differs from person to person. In FIG. 8, the chaotic view axis A1 inclines clockwise by 45 degrees relative to the X axis while the chaotic view axis A2 inclines clockwise by 45 degrees relative to the Y axis.

However, it is possible for example that the chaotic view axis A1 is parallel to the X axis while the chaotic view axis A2 is parallel to the Y axis. In this case, the focal length corresponding to the chaotic view axis A1 of the eye is set by the liquid crystal lens part sets J11, J21, J14, and J24. By contrast, the focal length corresponding to the chaotic view axis A2 of the eye can be set by the liquid crystal lens part sets J12, J22, J13, and J23. In this case, an astigmatism of the liquid crystal element 100C corresponding to the chaotic view axes A1 and A2 can be set without need to rotate the liquid crystal element 100C in the circumferential direction CD. Thus, astigmia can be easily corrected using the liquid crystal element 100C.

For example, it is possible that the chaotic view axis A1 inclines clockwise by 50 degrees relative to the X axis while the chaotic view axis A2 inclines clockwise by 50 degrees relative to the Y axis. In this case, the focal length corresponding to the chaotic view axis A1 of the eye is set by the liquid crystal lens part sets J11, J21, J12, and J22. By contrast, the focal length corresponding to the chaotic view axis A2 of the eye can be set by the liquid crystal lens part sets J13, J23, J14, and J24. In this case, an astigmatism of the liquid crystal element 100C corresponding to the chaotic view axes A1 and A2 can be set by rotating the liquid crystal element 100C clockwise by 5 degrees in the circumferential direction CD. Thus, astigmia can be easily corrected using the liquid crystal element 100C.

In particular, the larger the number of the liquid crystal lens part sets Jpk arranged side by side in the circumferential direction CD is, that is, the larger the number of the liquid crystal lens parts Bbq arranged side by side in the circumferential direction CD is, an astigmatism can be caused in the liquid crystal element 100C corresponding to the chaotic view axes A1 and A2 of a larger number of persons without need to rotate the liquid crystal element 100C in the circumferential direction CD or while relatively reducing the rotational angle of the liquid crystal element 100C in the circumferential direction CD.

That is, an astigmatism according to the directions of the chaotic view axes A1 and A2 can be caused by changing the position of the liquid crystal lens part sets Jpk with the same focal length in the circumferential direction CD unit by unit of the liquid crystal lens part set Jpk. For example, the attention focuses on the lens area LZ1 for simplicity. Further, when it is assumed that the lens area LZ1 is divided into for example 16 areas in the circumferential direction CD, q is 16 and k is 8. Accordingly, in this case, the position of the liquid crystal lens part sets Jpk with the same focal length can be changed unit by unit of the liquid crystal lens part set Jpk, that is, per 22.5 degrees in the circumferential direction CD without need to rotate the liquid crystal element 100C in the circumferential direction CD.

Furthermore, the liquid crystal lens parts Bbp arranged side by side in the circumferential direction CD may have three or more focal lengths different in the circumferential direction CD. For example, the liquid crystal lens part sets Jpk arranged side by side in the circumferential direction CD may have three or more focal lengths different in the circumferential direction CD. In this case, an astigmatism can be formed according to an astigmatic eye in an ellipsoidal shape. As a result, astigmia can be corrected further precisely. For example, the focal lengths of the liquid crystal lens part sets Jpk arranged side by side in the circumferential direction CD are differentiated in a stepwise manner in the circumferential direction CD.

Figure 9:
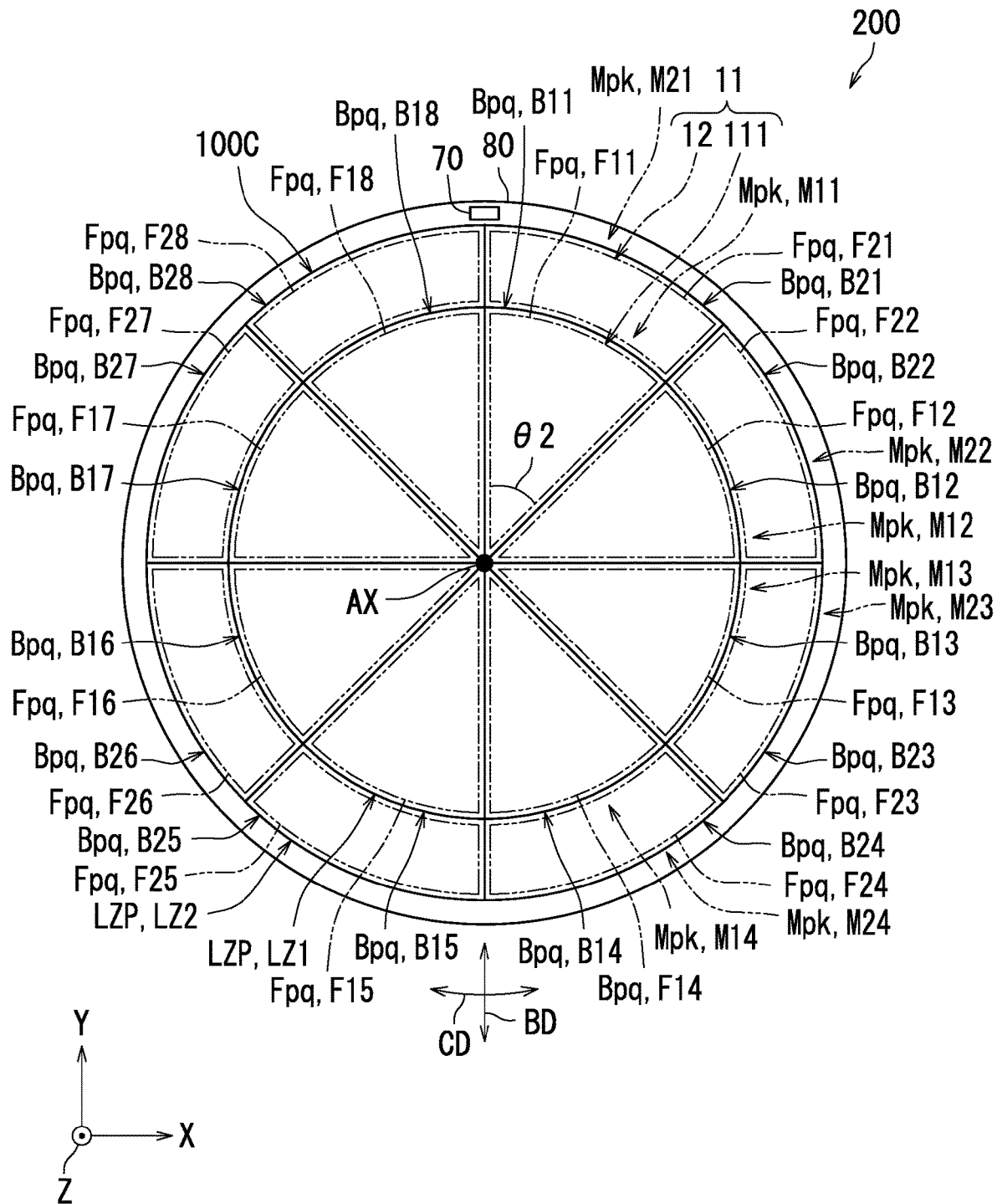
FIG. 9 is a plan view of an electrode placement area of the liquid crystal device according to the third embodiment.

An electrode placement area 11 will be described next with reference to FIG. 9. FIG. 9 is a plan view of the electrode placement area 11 of the liquid crystal device 200 according to the third embodiment. As illustrated in FIG. 9, the liquid crystal element 100C of the liquid crystal device 200 has an electrode placement area 11 similar to the electrode placement area 11 in the first embodiment. The electrode placement area 11 in the third embodiment includes a circular area 111 similar to the circular area 111 in the first embodiment. The electrode placement area 11 in the third embodiment preferably includes at least one annular band-shaped area 12 similar to the annular band-shaped areas 12 in the first embodiment. The circular area 111 and the annular band-shaped area 12 are disposed substantially concentrically about the optical axis AX. The circular area 111 is located in the lens area LZ1. The annular band-shaped area 12 is located in the lens area LZ2.

The electrode placement area 11 includes a plurality of circumferential direction areas Fpq. The subscript p in the reference numeral "Fpq" indicates the number of a corresponding circumferential direction area Fpq in the radial direction RD. Specifically, the subscript "p" is assigned to each circumferential direction area Fpq in the ascending order toward the outside in the radial direction RD. The subscript q in the reference numeral "Fpq" indicates the number of a corresponding circumferential direction area Fpq in the circumferential direction CD. Specifically, the subscript "q" is assigned to each circumferential direction area Fpq in the ascending order clockwise in the circumferential direction CD. Further specifically, the subscript "q" indicates the number of partitions in the circumferential direction CD of each of the circular area 111 and the annular band-shaped area 12. In the example illustrated in FIG. 9, p represents 1 or 2 and q represents any of 1 to 8.

The circular area 111 has a substantially circular shape in a plan view, for example. The optical axis AX passes through a substantial center of the circular area 111. The circular area 111 includes circumferential direction areas F11 to F18. The circumferential direction areas F11 to F18 are arranged side by side in the circumferential direction CD. The circumferential direction areas F11 to F18 are located in the liquid crystal lens parts B11 to B18, respectively. The circumferential direction areas F11 to F18 each have a substantially fan shape in a plan view, for example. Furthermore, the circumferential direction areas F11 to F18 include at least two circumferential direction areas Fpq that set different focal lengths. Accordingly, in a situation in which the liquid crystal element 100C of the third embodiment is used for an eye of a person, the respective focal lengths of the liquid crystal lens parts B11 to B18 can be set according to the states of corresponding parts of the eyeball.

The annular band-shaped area 12 has a substantially annular band shape in a plan view, for example. The annular band-shaped area 12 is located outside of the circular area 111 in the radial direction RD. The annular band-shaped area 12 surrounds the circular area 111 in the circumferential direction CD.

The annular band-shaped area 12 includes circumferential direction areas F21 to F28. The circumferential direction areas F21 to F28 are arranged side by side in the circumferential direction CD. The circumferential direction areas F21 to F28 are located in the liquid crystal lens parts B21 to B28, respectively. The circumferential direction areas F21 to F28 each have a substantially arcuate band shape in a plan view, for example. Furthermore, the circumferential direction areas F21 to F28 include at least two circumferential direction areas F21 to F28 that set different focal lengths. Accordingly, in the third embodiment, in a situation in which the liquid crystal element 100C is used for an eye of a person, the focal lengths of the liquid crystal lens parts B21 to B28 can be set according to the states of corresponding parts of the eyeball.

Preferably, an astigmatism is caused in the liquid crystal element 100C by setting different focal lengths for at least two circumferential direction areas Fpq. In the above preferable example, the liquid crystal element 100C can be used as a liquid crystal lens for astigmia correction.

Of the circumferential direction areas Fpq, paired circumferential direction areas Fpq located opposite to each other in the radial direction RD with the optical axis AX therebetween set substantially the same focal length. In the example illustrated in FIG. 9, the paired circumferential direction areas F11 and F15 are located opposite to each other in the radial direction RD while the paired circumferential direction areas F12 and F16 are located opposite to each other in the radial direction RD. Also, the paired circumferential direction areas F13 and F17 are located opposite to each other in the radial direction RD while the paired circumferential direction areas F14 and F18 are located opposite to each other in the radial direction RD. Furthermore, the paired circumferential direction areas F21 and F25 are located opposite to each other in the radial direction RD while the paired circumferential direction areas F22 and F26 are located opposite to each other in the radial direction RD. In addition, the paired circumferential direction areas F23 and F27 are located opposite to each other in the radial direction RD while the paired circumferential direction areas F24 and F28 are located opposite to each other in the radial direction RD.

For example, the paired circumferential direction areas F11 and F15 are opposite to each other in the radial direction RD with the optical axis AX therebetween. Accordingly, a spot of light imaged at the focal point on the optical axis AX can be reduced in size by the paired liquid crystal lens parts B11 and B15 corresponding to the paired circumferential direction areas F11 and F15. The same applies to the other pairs of circumferential direction areas Fpq.

The number of the circumferential direction areas Fpq arranged side by side in the circumferential direction CD is preferably an even number. In the example illustrated in FIG. 9, the number of the circumferential direction areas F11 to F18 arranged side by side in the circumferential direction CD is 8. The number of the circumferential direction areas F21 to F28 arranged side by side in the circumferential direction CD is 8.

Paired circumferential direction areas Fpq opposite to each other in the radial direction RD with the optical axis AX therebetween form a circumferential direction area set Mpk. The subscript p in the reference numeral "Mpk" indicates the number of a corresponding circumferential direction area set Mpk in the radial direction RD. Specifically, the subscript "p" is assigned to each circumferential direction area set Mpk in the ascending order toward the outside in the radial direction RD. The subscript k in the reference numeral "Mpk" indicates the number of a corresponding circumferential direction area set Mpk in the circumferential direction CD. Specifically, the subscript "k" is assigned to each circumferential direction area set Mpk in the ascending order clockwise in the circumferential direction CD. In the example illustrated in FIG. 9, p represents 1 or 2 and k represents any of 1 to 4. For example, k is q/2.

In the example illustrated in FIG. 9, the paired circumferential direction areas F11 and F15 form a circumferential direction area set M11 while the paired circumferential direction areas F12 and F16 form a circumferential direction area set M12. Also, the paired circumferential direction areas F13 and F17 form a circumferential direction area set M13 while the paired circumferential direction areas F14 and F18 form a circumferential direction area set M14. Furthermore, the paired circumferential direction areas F21 and F25 form a circumferential direction area set M21 while the paired circumferential direction areas F22 and F26 form a circumferential direction area set M22. Moreover, the paired circumferential direction areas F23 and F27 form a circumferential direction area set M23 while the paired circumferential direction areas F24 and F28 form a circumferential direction area set M24.

The number of the circumferential direction area sets M11, M12, M13, and M14 arranged side by side in the circumferential direction CD is preferably an even number (e.g., 4). The number of the circumferential direction area sets M21, M22, M23, and M24 arranged side by side in the circumferential direction CD is preferably an even number (e.g., 4).

The circumferential direction area sets M11, M12, M13, and M14 arranged side by side in the circumferential direction CD are respectively located in the liquid crystal lens part sets J11, J12, J13, and J14 (FIG. 8) arranged side by side in the circumferential direction CD, and set substantially the same focal length. The circumferential direction area sets M21, M22, M23, and M24 arranged side by side in the circumferential direction CD are respectively located in the liquid crystal lens part sets J21, J22, J23, and J24 (FIG. 8) arranged side by side in the circumferential direction CD, and set substantially the same focal length.

The circumferential direction area sets Mpk include at least two circumferential direction area sets Mpk that set different focal lengths. Specifically, the focal length set by the circumferential direction area sets M11 and M12 differs from the focal length set by the circumferential direction area sets M13 and M14. The focal length set by the circumferential direction area sets M21 and M22 differs from the focal length set by the circumferential direction area sets M23 and M24.

As described so far with reference to FIG. 9, the even number of circumferential direction area sets Mpk include at least two circumferential direction area sets Mpk with different focal lengths in the third embodiment. Accordingly, the focal length corresponding to the chaotic view axis A1 (FIG. 8) of the eye can be set by the circumferential direction area sets M11, M21, M12, and M22 of the even number of circumferential direction area sets Mpk. By contrast, the focal length corresponding to the chaotic view axis A2 (FIG. 8) of the eye can be set by the circumferential direction area sets M13, M23, M14, and M24 of the even number of circumferential direction area sets Mpk. Accordingly, an astigmatism corresponding to the chaotic view axis A1 and the chaotic view axis A2 orthogonal to each other can be caused in the liquid crystal element 100C. As a result, astigmia can be effectively corrected.

In particular, each central angle θ2 of the circumferential direction areas Fpq is preferably less than or equal to 90 degrees in the third embodiment. In other words, each central angle θ2 of the circumferential direction area sets Mpk is preferably less than or equal to 90 degrees. In the above preferable example, an astigmatism can be caused in the liquid crystal element 100C according to the chaotic view axes A1 and A2 for each person without need to rotate the liquid crystal element 100C in the circumferential direction CD or while relatively reducing the rotational angle of the liquid crystal element 100C in the circumferential direction CD. The central angle θ2 is substantially the same as the central angle θ1 in FIG. 8.

For example, it is possible that the chaotic view axis A1 (FIG. 8) is parallel to the X axis while the chaotic view axis A2 (FIG. 8) is parallel to the Y axis. In this case, the focal length corresponding to the chaotic view axis A1 of the eye is set by the circumferential direction area sets M11, M21, M14, and M24. By contrast, the focal length corresponding to the chaotic view axis A2 of the eye can be set by the circumferential direction area sets M12, M22, M13, and M23. In this case, an astigmatism of the liquid crystal element 100C corresponding to the chaotic view axes A1 and A2 can be set without need to rotate the liquid crystal element 100C in the circumferential direction CD.

For example, it is possible that the chaotic view axis A1 inclines clockwise by 50 degrees relative to the X axis while the chaotic view axis A2 inclines clockwise by 50 degrees relative to the Y axis. In this case, the focal length corresponding to the chaotic view axis A1 of the eye is set by the circumferential direction area sets M11, M21, M12, and M22. By contrast, the focal length corresponding to the chaotic view axis A2 of the eye can be set by the circumferential direction area sets M13, M23, M14, and M24. In this case, an astigmatism of the liquid crystal element 100C corresponding to the chaotic view axes A1 and A2 can be set by rotating the liquid crystal element 100C clockwise by 5 degrees in the circumferential direction CD.

In particular, as the number of the circumferential direction area sets Mpk arranged side by side in the circumferential direction CD is increased, that is, as the number of the circumferential direction areas Fpq arranged side by side in the circumferential direction CD is increased, astigmatisms corresponding to the chaotic view axes A1 and A2 can be caused in the liquid crystal element 100C for more persons without need to rotate liquid crystal element 100C in the circumferential direction CD or while relatively reducing the rotational angle of the liquid crystal element 100C in the circumferential direction CD.

That is, an astigmatism according to the directions of the chaotic view axes A1 and A2 can be caused by changing the position of the circumferential direction area sets Mpk with the same focal length in the circumferential direction CD unit by unit of the circumferential direction area set Mpk. For example, the attention focuses on the circular area 111 for simplicity. Further, when it is assumed that the circular area 111 is divided into for example 16 areas in the circumferential direction CD, q is 16 and k is 8. Accordingly, in this case, the positions of the circumferential direction area sets Mpk that set the same focal length can be changed in the circumferential direction CD unit by unit of the circumferential direction area set Mpk, that is, per 22.5 degrees without need to rotate the liquid crystal element 100C in the circumferential direction CD.

Furthermore, three or more focal lengths different in circumferential direction CD may be set in the circumferential direction areas Fpq arranged side by side in the circumferential direction CD. For example, three or more focal lengths different in the circumferential direction CD may be set in circumferential direction area sets Mpk arranged side by side in the circumferential direction CD. In this case, the liquid crystal lens part sets Jpk arranged side by side in the circumferential direction CD have three or more focal lengths different in the circumferential direction CD. Accordingly, an astigmatism can be formed according to an astigmatic eyeball in an ellipsoidal shape. As a result, astigmia can be corrected further precisely.

Here, the liquid crystal device 200 further includes a controller 70 and an enclosure portion 80 as illustrated in FIG. 9. The enclosure portion 80 encloses the liquid crystal element 100C in the circumferential direction CD. The controller 70 is disposed in the enclosure portion 80, for example. The controller 70 controls each of the first voltage Vpq1 and the second voltage Vpq2 applied to each of the circumferential direction areas Fpq. That is, the controller 70 controls the first voltage Vpq1 and the second voltage Vpq2 for each circumferential direction area Fpq. The subscript p and the subscript q in the reference signs "Vpq1" and "Vpq2" are the same as the subscript p and the subscript q in the reference signs "Fpq", respectively.

Figure 10:
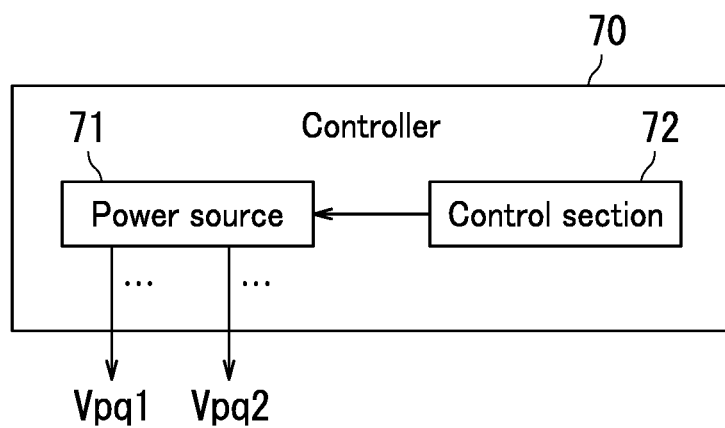
FIG. 10 is a block diagram of a controller of the liquid crystal device according to the third embodiment.

The controller 70 will be described next with reference to FIG. 10. FIG. 10 is a block diagram of the controller 70 in the third embodiment. As illustrated in FIG. 10, the controller 70 includes a power source 71 and a control section 72.

The control section 72 controls the power source 71. The control section 72 includes storage and a processor such as a central processing unit (CPU). The storage stores data and computer programs therein. Specifically, the storage includes a main storage device such as semiconductor memory and an auxiliary storage device such as semiconductor memory.

The power source 71 generates the first voltage Vpq1 and the second voltage Vpq2. The controller 70 controls the power source 71 to apply the first voltage Vpq1 and the second voltage Vpq2 to each circumferential direction areas Fpq. The first voltage Vpq1 and the second voltage Vpq2 each are an alternating current voltage. Where the radial direction number p and the circumferential direction number q are the same as each other, the second voltage Vpq2 differs from the first voltage Vpq1. For example, the maximum amplitude or the effective value of the second voltage Vpq2 differs from the maximum amplitude or the effective value of the first voltage Vpq1.

The power source 71 includes a battery and a power supply circuit. Furthermore, the power source 71 may generate a plurality of the first voltages Vpq1 with different maximum amplitude or effective values and may generate a plurality of the second voltages Vpq2 with different maximum amplitude or effective values. Note that the power source 71 may include a power supply circuit for each of the different first voltages Vpq1 and may include a power supply circuit for each of the different second voltages Vpq2.

Figure 11:
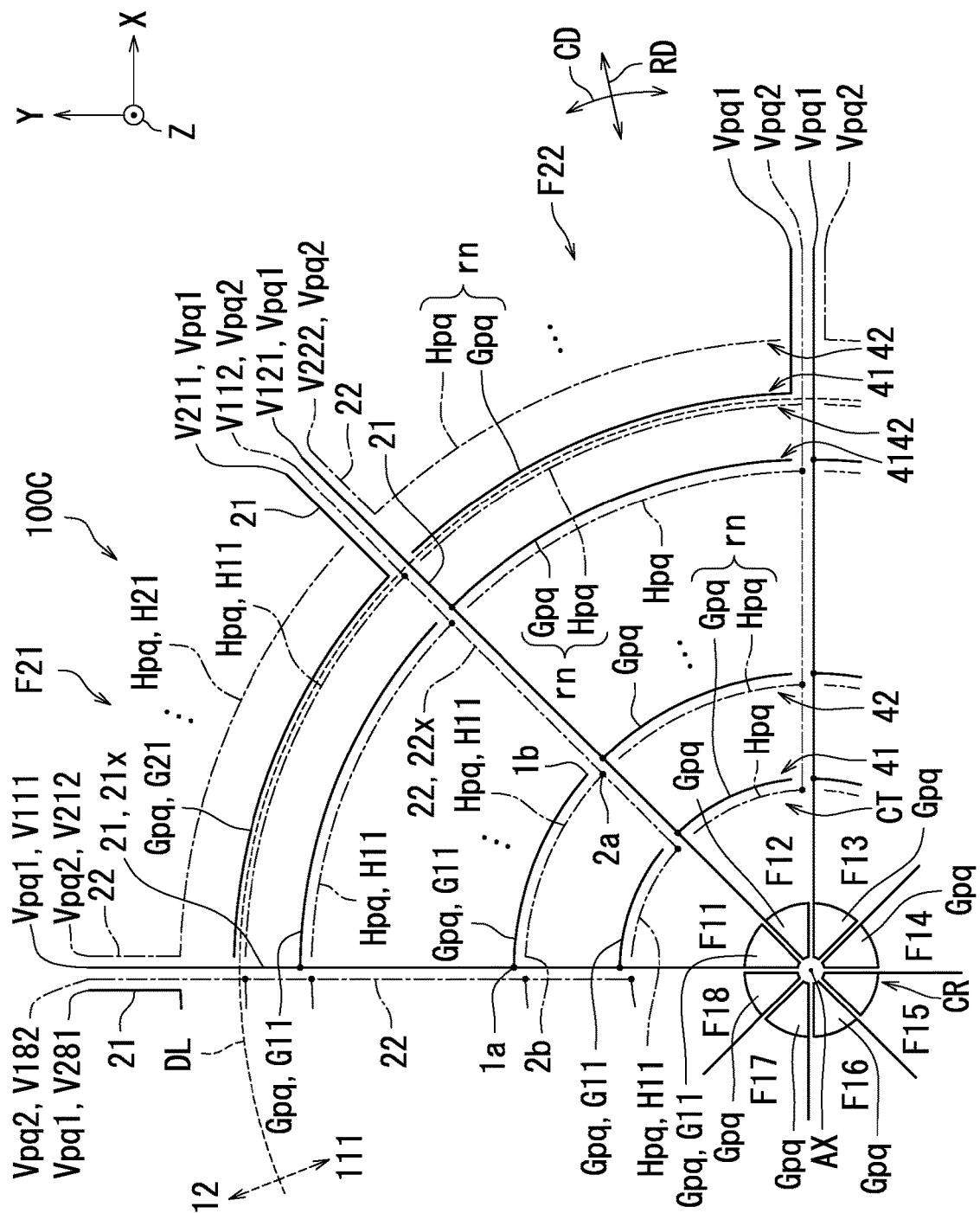
FIG. 11 is a diagram illustrating an electrical configuration of a liquid crystal element of the liquid crystal device according to the third embodiment.

The circumferential direction areas Fpq will be described next in detail with reference to FIG. 11. FIG. 11 is a diagram illustrating the electrical configuration of the liquid crystal element 100C. For easy understanding of the drawing, FIG. 11 illustrates the entirety of each of the circumferential direction areas F11 and F12 in FIG. 9 and a part of each of the circumferential direction areas F21 and F22 in FIG. 9. Furthermore, for facilitating undemanding of the drawing, a broken line DL is indicated as a boundary between the circular area 111 and the annular band-shaped areas 12. The following mainly describes the circumferential direction area F11. The configuration of the circumferential direction areas F12 to F18 is the same as the configuration of the circumferential direction areas F11, and therefore description thereof is omitted.

As illustrated in FIG. 11, the liquid crystal element 100C includes a plurality of first arcuate electrodes Gpq and a plurality of second arcuate electrodes Hpq. The first arcuate electrodes Gpq are disposed at the same layer level. The second arcuate electrodes Hpq are disposed at the same layer level. The first arcuate electrodes Gpq and the second arcuate electrodes Hpq are disposed at the same layer level.

The first arcuate electrodes Gpq and the second arcuate electrodes Hpq are disposed in the electrode placement area 11 (FIG. 9) including the circular area 111 and the annular band-shaped area 12. The subscript p and the subscript q in the reference signs "Gpq" and "Hpq" are the same as the subscript p and the subscript q in the reference signs "Fpq" for the circumferential direction areas Fpq (FIG. 9), respectively.

In the circular area 111, two or more innermost first arcuate electrodes Gpq (G11 to G18) of the first arcuate electrodes Gpq constitute the core electrode CR. The two or more innermost first arcuate electrodes Gpq (G11 to G18) are arranged in the circumferential direction CD and surround the optical axis AX. The innermost first arcuate electrodes G11 each have a substantially fan shape, for example. In this case, the first arcuate electrodes G11 each have an outer edge with a substantially arc shape. Note that the other first arcuate electrodes G12 to G18 constituting the core electrode CR has the same shape as the first arcuate electrodes G11. Alternatively, the innermost first arcuate electrodes G11 may have a substantially triangular shape, for example. Also in this case, the outer edge of the first arcuate electrodes G11 can be considered as a part of a substantial circle of the core electrode CR as a whole. Note that the liquid crystal element 100C may not include the core electrode CR.

In the circular area 111, two or more innermost second arcuate electrodes Hpq (H11 to H18) of the second arcuate electrodes Hpq constitute the center electrode CT. The two or more innermost second arcuate electrodes Hpq (H11 to H18) are arranged in the circumferential direction CD and surround the core electrode CR. The innermost second arcuate electrodes H11 each are substantially arc-shaped. For the rest, the configuration of the innermost second arcuate electrode H11 is the same as the configuration of the second arcuate electrode 2 (FIG. 2). Note that the shape of the other second arcuate electrodes H12 to H18 constituting the center electrode CT is the same as the shape of the second arcuate electrode H11.

In the circular area 111, each of two or more first arcuate electrodes Gpq (G11 to G18) of the first arcuate electrodes Gpq other than the first arcuate electrodes Gpq (G11 to G18) constituting the core electrode CR are substantially arc-shaped and has the same configuration as the first arcuate electrode 1 (FIG. 1).

In the circular area 111, each of two or more second arcuate electrodes Hpq (H11 to H18) of the second arcuate electrodes Hpq other than the second arcuate electrodes Hpq (H11 to H18) constituting the center electrode CT is substantially arc-shaped and has the same configuration as the second arcuate electrode 2 (FIG. 2).

The first arcuate electrodes Gil arranged at intervals in the radial direction RD are disposed in the circumferential direction area F11. The first arcuate electrodes G11 are arranged substantially concentrically about the optical axis AX. The same applies to the first arcuate electrodes G12 to G18 in the respective circumferential direction areas F12 to F18.

The second arcuate electrodes H11 arranged at intervals in the radial direction RD are disposed in the circumferential direction area F11. The second arcuate electrodes H11 are arranged substantially concentrically about the optical axis AX. The same applies to the second arcuate electrodes H12 to H18 in the respective circumferential direction area F12 to F18.

In the annular band-shaped area 12, two or more first arcuate electrodes Gpq (G21 to G28) each are substantially arc-shaped and have the same configuration as the first arcuate electrodes 1 (FIG. 1). Note that FIG. 11 illustrates only one of the first arcuate electrodes G21.

In the annular band-shaped area 12, two or more second arcuate electrodes Hpq (H21 to H28) each are substantially arc-shaped and have the same configuration as the second arcuate electrodes 2 (FIG. 2). Note that FIG. 11 illustrates only one of the second arcuate electrodes H21.

The first arcuate electrodes G21 arranged at intervals in the radial direction RD are disposed in the circumferential direction area F21. The first arcuate electrodes G21 are arranged substantially concentrically about the optical axis AX. The same applies to the second arcuate electrodes G22 to G28 in the respective circumferential direction areas F22 to F28.

The second arcuate electrodes H21 arranged at intervals in the radial direction RD are disposed in the circumferential direction area F21. The second arcuate electrodes H21 are arranged substantially concentrically about the optical axis AX. The same applies to the second arcuate electrodes H22 to H28 in the respective circumferential direction areas F22 to F28.

In the circular area 111 and the annular band-shaped area 12, two or more first arcuate electrodes Gpq of the first arcuate electrodes Gpq located on the same circumference constitute a first electrode 41. As such, the first electrodes 41 are arranged substantially concentrically about the optical axis AX in the liquid crystal element 100C. First arcuate electrodes Gpq adjacent to each other in the circumferential direction CD are separate from each other in the circumferential direction CD. First arcuate electrodes Gpq adjacent to each other in the radial direction RD are separate from each other in the radial direction RD.

In the circular area 111 and the annular band-shaped area 12, two or more second arcuate electrodes Hpq of the second arcuate electrodes Hpq located on the same circumference constitute the second electrode 42. As such, the second electrodes 42 are arranged substantially concentrically about the optical axis AX in the liquid crystal element 100C. Second arcuate electrodes Hpq adjacent to each other in the circumferential direction CD are separate from each other in the circumferential direction CD. Second arcuate electrodes Hpq adjacent to each other in the radial direction RD are separate from each other in the radial direction RD.

In the circular area 111 and the annular band-shaped area 12, a first arcuate electrode Gpq and a second arcuate electrode Hpq adjacent to each other in the radial direction RD constitute a unit electrode rn. In this case, for example, the unit electrode rn is constituted by the first arcuate electrode Gpq and the second arcuate electrode Hpq adjacent to each other in the radial direction RD. In each unit electrode rn, the first arcuate electrode Gpq is disposed inside of the second arcuate electrode Hpq in the radial direction RD. For the rest, the configuration of the unit electrodes rn is the same as the unit electrode rn in the first embodiment.

The liquid crystal element 100C further includes a plurality of first radial direction lead wires 21. The first radial direction lead wires 21 are each provided in a corresponding one of the circumferential direction areas Fpq (FIG. 9). For example, one first radial direction lead wire 21x is provided for the circumferential direction area F11.

The first radial direction lead wire 21x extends outward in the radial direction RD. The first radial direction lead wire 21x is connected to the respective one ends 1a of the first arcuate electrodes G11. In the above configuration, the first voltage Vpq1 (specifically, V111) is applied to the first arcuate electrodes G11 via the first radial direction lead wire 21x. In the example illustrated in FIG. 11, the first radial direction lead wire 21x is also connected to the first arcuate electrodes G11 constituting the core electrode CR. The other first radial direction lead wires 21 have the same configuration as the first radial direction lead wire 21x. The first radial direction lead wires 21 extend radially to the optical axis AX. For the rest, the configuration of the first radial direction lead wires 21 is the same as the first radial direction lead wires 21 in the first embodiment. Furthermore, the liquid crystal element 100C according to the third embodiment may include first circumferential direction lead wires 31 similar to those in the first embodiment.

The liquid crystal element 100C further includes a plurality of second radial direction lead wires 22. The second radial direction lead wires 22 are each provided for a corresponding one of the circumferential direction areas Fpq (FIG. 9). For example, one second radial direction lead wire 22x is provided for the circumferential direction area F11.

The second radial direction lead wire 22x extends outward in the radial direction RD. The second radial direction lead wire 221x is connected to the respective one ends 2a of the second arcuate electrodes H11. In the above configuration, the second voltage Vpq2 (specifically V112) is applied to the second arcuate electrode H11 via the second radial direction lead wire 22x. In the example illustrated in FIG. 11, the second radial direction lead wire 22x is also connected to the second arcuate electrodes H11 constituting the center electrode CT. The other second radial direction lead wires 22 have the same configuration as the second radial direction lead wire 22x. The second radial direction lead wires 22 extend radially to the optical axis AX. For the rest, the configuration of the second radial direction lead wires 22 is the same as the second radial direction lead wires 22 in the first embodiment. Furthermore, the liquid crystal element 100C according to the third embodiment may include second circumferential direction lead wires 32 similar to those in the first embodiment.

Note that the sectional configuration of the liquid crystal element 100C is the same as the sectional configuration of the liquid crystal element 100 in the first embodiment described with reference to FIG. 5. Moreover, the liquid crystal element 100C can function as a Fresnel lens likewise the liquid crystal element 100 in the first embodiment.

As described above with reference to FIG. 11, the first radial direction lead wires 21 and the second radial direction lead wires 22 are provided for the respective circumferential direction areas Fpq (FIG. 9). In each of the circumferential direction areas Fpq (FIG. 9), the first voltage Vpq1 is applied to the first arcuate electrode Gpq while the second voltage Vpq2 is applied to the second arcuate electrode Hpq. The above configuration enables the controller 70 (FIG. 10) to control the first voltage Vpq1 and the second voltage Vpq2 for each circumferential direction area Fpq (FIG. 9). As a result, the focal length can be changed for each circumferential direction area Fpq. That is, the focal length can be changed for each liquid crystal lens part Bpq (FIG. 8). Specifically, the focal length is changed according to a difference DEF between the first voltage Vpq1 having been applied to the first arcuate electrodes Gpq and the second voltage Vpq2 having been applied to the second arcuate electrodes Hpq. As such, the controller 70 can differentiate the focal length for each liquid crystal lens part Bpq (FIG. 8) by differentiating the difference DEF between the first voltage Vpq1 and the second voltage Vpq2 for each circumferential direction area Fpq (FIG. 9).

Further specifically, as illustrated in FIG. 10, the controller 70 controls the difference DEF between the first voltage Vpq1 and the second voltage Vpq2 by controlling the first voltage Vpq1 and the second voltage Vpq2. Control of the difference DEF enables control of the potential gradient in the liquid crystal layer LQ (FIG. 5) of the liquid crystal lens parts Bpq (FIG. 8). As a result, each focal length of the liquid crystal lens parts Bpq can be controlled. The difference DEF may be a difference between a voltage value (e.g., an effective value) of the first voltage Vpq1 and a voltage value (e.g., an effective value) of the second voltage Vpq2 or a difference between the frequency of the first voltage Vpq1 and the frequency of the second voltage Vpq2.

Preferably, the controller 70 applies the same first voltage Vpq1 to the first arcuate electrodes Gpq and applies the same second voltage Vpq2 to the second arcuate electrodes Hpq in each pair of circumferential direction areas Fpq (FIG. 9) forming a circumferential direction area set Mpk. As a result, the focal lengths of the paired liquid crystal lens parts Bpq opposite to each other with the optical axis AX therebetween are substantially the same as each other in each liquid crystal lens part set Jpk (FIG. 8) corresponding to a circumferential direction area set Mpk.

The present invention will be described next specifically based on examples. However, the present invention is not limited to the following examples.

EXAMPLES

Examples 1 to 6 of the present invention will be described with reference to FIGS. 12 to 14. In Examples 1 to 6, various simulations were performed on the liquid crystal element 100 according to the first embodiment.

In Examples 1 to 6, the first voltage V1 had an effective value of 1 V and the second voltage V2 had an effective value of 2 V. As such, the liquid crystal element 100 constitutes a convex Fresnel lens. The liquid crystal element 100 included one core electrode CR and one center electrode CT. Furthermore, the number of the unit electrodes rn arranged side by side in the radial direction RD is 200. In addition, the liquid crystal element 100 had 3 annular band-shaped areas 12 arranged side by side in the radial direction RD. In the order from the inside, 18 unit electrodes rn arranged side by side in the radial direction RD are disposed in a first annular band-shaped area 12, 65 unit electrodes rn arranged side by side in the radial direction RD are disposed in a second annular band-shaped area 12, and 117 unit electrodes rn arranged side by side in the radial direction RD are disposed in a third annular band-shaped area 12. Further, in the order from the inside, the first annular band-shaped area 12 included 2 arcuate band-shaped areas 113, the second annular band-shaped area 12 included 4 arcuate band-shaped areas 113, and the third annular band-shaped area 12 included 4 arcuate band-shaped areas 113.

Figure 12:
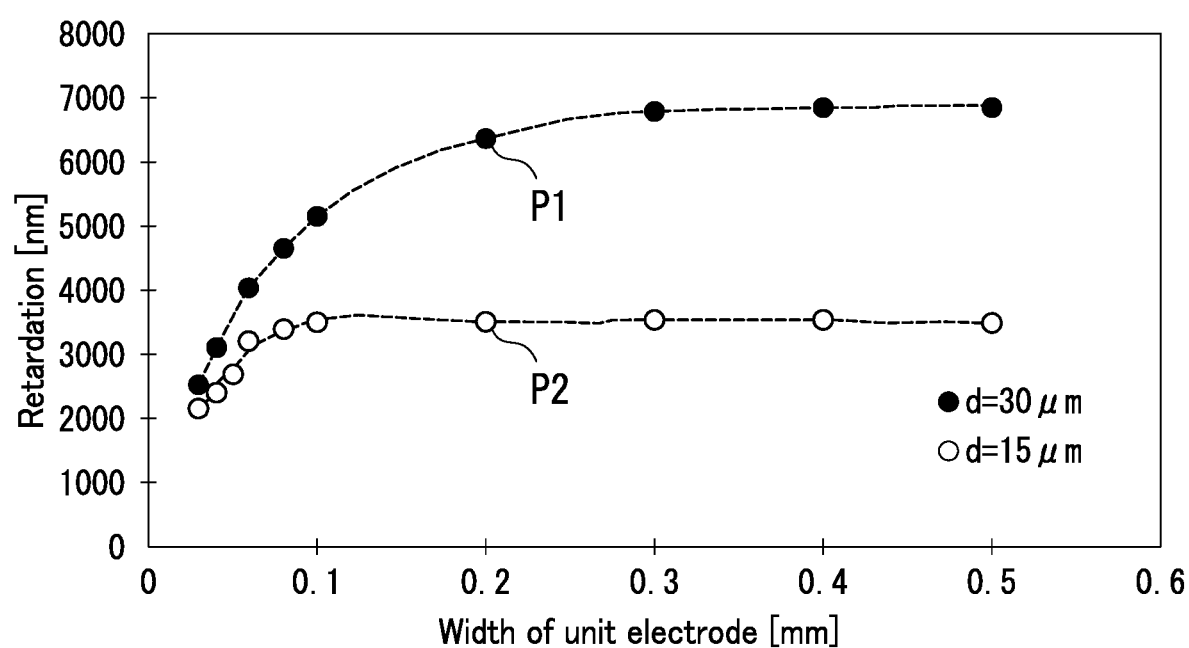
FIG. 12 is a graph representation showing the relationship between retardation and width of a unit electrode of a liquid crystal element of each of Example 1 and Example 2.

FIG. 12 is a graph representation showing the relationship between retardation and the width of the unit electrodes rn in Examples 1 and 2 of the present invention. In FIG. 12, the horizontal axis indicates the width do (mm) of the unit electrodes rn while the vertical axis indicates retardation (nm) of the liquid crystal element 100. Specifically, the retardation shown in FIG. 12 indicates an amplitude difference of the retardation in each unit electrode rn. Furthermore, the radius Rn of each unit electrode rn was calculated using formula (2) mentioned above.

As shown in FIG. 12, points P1 indicated simulation results of retardation when the thickness d of the liquid crystal layer LQ was 30 μm. The amplitude difference of retardation attenuated when the width dn of the unit electrode rn was less than or equal to 0.2 mm. The amplitude difference of retardation was substantially unvarying when the width dn of the unit electrode rn was greater than 0.2 mm.

Points P2 indicated simulation results of retardation when the thickness d of the liquid crystal layer LQ was 15 μm. The amplitude difference of retardation attenuated when the width dn of the unit electrode rn was less than 0.1 mm. The amplitude difference of retardation was substantially unvarying when the width dn of the unit electrode rn was more than or equal to 0.1 mm.

The present invention is applicable regardless of attenuation or non-attenuation of the amplitude difference of retardation. However, the present inventor tried the following method in order for the present invention to be further preferable.

That is, in order to inhibit attenuation of the amplitude difference of retardation, the width dn of unit electrodes rn located outside of a specific location PS in the radial direction RD was set smaller than the width of unit electrodes rn defined according to the radius Un expressed by formula (1) mentioned above in Example 3 of the present invention. The specific location PS indicated the radius of the liquid crystal element 100 when the width dn of the unit electrodes rn was less than or equal to 200 μm. Furthermore, the radius Rn of the unit electrodes rn was calculated using formula (2) mentioned above as Example 4 of the present invention.

Furthermore, in Examples 3 and 4, the diameter of the beam spot formed by beam emission by the liquid crystal element 100 was calculated by the ray-tracing method. The liquid crystal element 100 had a thickness d of 30 μm.

Figure 13:
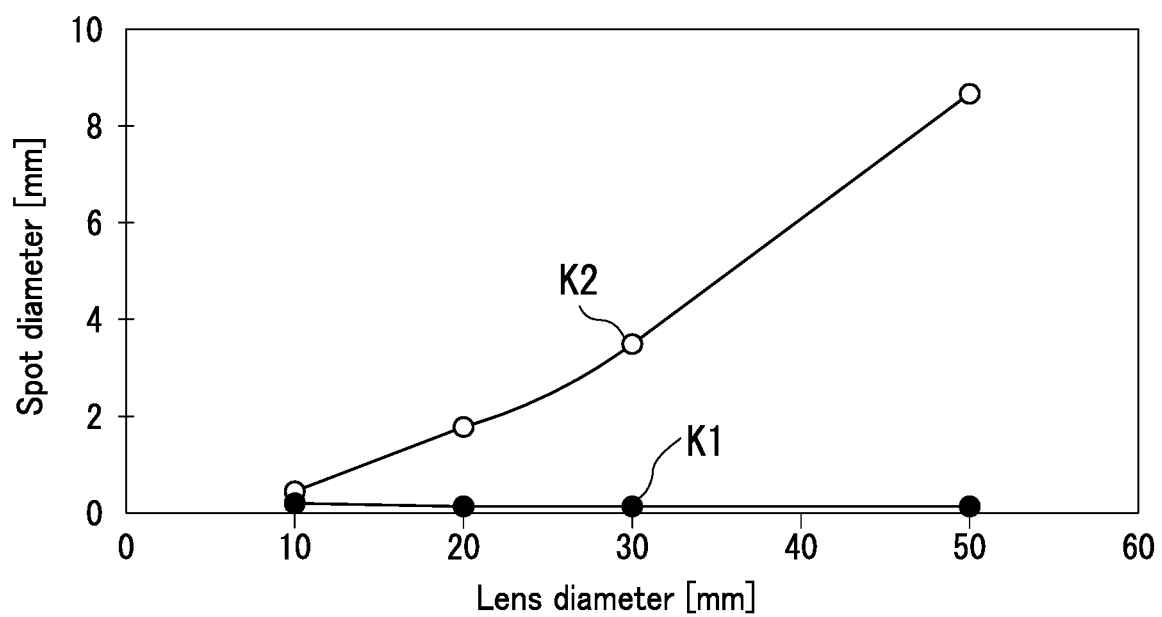
FIG. 13 is a graph representation showing the relationship between lens diameter and beam spot diameter of a liquid crystal element of each of Example 3 and Example 4.

FIG. 13 is a graph representation showing the relationship between the beam spot diameter and the lens diameter of the liquid crystal element 100 in Examples 3 and 4 of the present invention. In FIG. 13, the horizontal axis indicates the diameter of the liquid crystal element 100, that is, the lens diameter (mm). The vertical axis indicates the diameter (mm) of the beam spot formed by beam emission by the liquid crystal element 100.

As shown in FIG. 13, points K1 indicated the diameter of a beam spot in Example 3. In Example 5, the diameter of the beam spot was substantially unvarying when the lens diameter was in a range up to 50 mm, and was approximately 0.1 mm. As a result, it was confirmed that wave aberration has been effectively reduced. In other words, it could be presumed that attenuation of the amplitude difference of retardation was inhibited in unit electrodes rn located outside of the specific location PS in the radial direction RD by setting the width do of the unit electrodes rn located outside of the specific location PS in the radial direction RD smaller than the width of unit electrodes defined according to the radius Un expressed by formula (1) mentioned above.

Points K2 indicated the diameter of a beam spot in Example 4. The larger the lens diameter was, the larger the diameter of the beam spot was. In other words, it could be deduced that when the radius Rn of the unit electrodes rn was set according to formula (2) mentioned above, the effect of attenuation of the amplitude difference of retardation was exerted on the beam spot in the unit electrode located outward in the radial direction RD. However, the present invention is applicable even in Example 4.

The height of the wavefront of light emitted from the liquid crystal element 100 was calculated through simulations in Examples 5 and 6 of the present invention. In Examples 3 and 4, the liquid crystal layer LQ had a thickness d of 30 μm.

When the position of the wavefront (also referred to below as "wavefront WS") of emitted light at the center of the emission plane of the liquid crystal element 100 was taken to be a reference point (specifically, zero), the height of the wavefront WS indicated a difference between the reference point and the position of the wavefront WS corresponding to each position of the liquid crystal element 100 in the radial direction RD. The optical axis AX passed through the central part of the emission plane.

Furthermore, in Example 5, the width dn of unit electrodes rn located outside of the specific location PS in the radial direction RD was set smaller than the width of unit electrodes defined according to the radius Un expressed by formula (1) mentioned above. The specific location PS indicated the radius of the liquid crystal element 100 where the width dn of the unit electrodes rn was less than or equal to 200 μm. Furthermore, in Example 6, the radius Rn of each unit electrode rn was calculated using formula (2) mentioned above.

Figure 14:
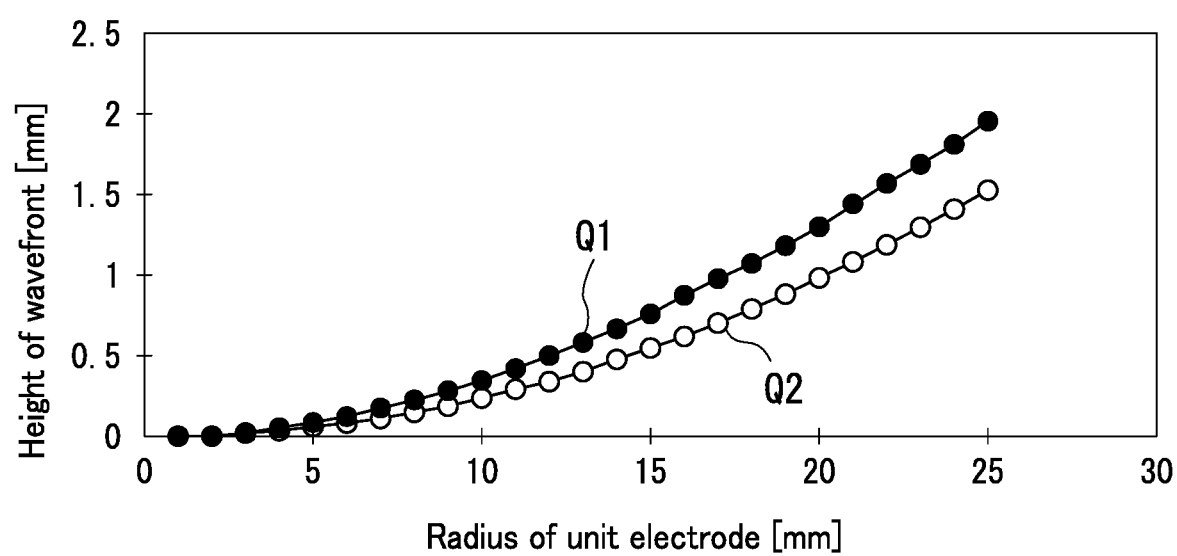
FIG. 14 is a graph representation showing height of the wavefront of light emitted from a liquid crystal element of each of Example 5 and Example 6.

FIG. 14 is a graph representation showing the height of the wavefronts in Examples 5 and 6 of the present invention. In FIG. 14, the horizontal axis indicates the radius Rn (mm) of each unit electrode rn. The vertical axis indicates the height of the wavefront of light emitted from the liquid crystal element 100.

As shown in FIG. 14, points Q1 indicated the height of the wavefront of the emitted light in Example 5. The larger the radius Rn was, the higher the height of the wavefront was. By contrast, points Q12 indicated the height of the wavefront of the emitted light in Example 6. The larger the radius Rn was, the higher the height of the wavefront was.

However, the height of the wavefront in Example 5 indicated by the points Q1 was higher than the height of the wavefront in Example 4 indicated by the points Q2. It could accordingly be deduced that wave aberration was more reduced in Example 5 than in Example 6. In other words, it could be presumed that attenuation of the amplitude difference of retardation was inhibited in unit electrodes rn located outside of the specific location PS in the radial direction RD by setting the width do of the unit electrodes rn located outside of the specific location PS in the radial direction RD smaller than the width of unit electrodes defined according to the radius Un expressed by formula (1) mentioned above.

Embodiments of the present invention have been described so far with reference to the accompanying drawings. However, the present invention is not limited to the above-described embodiments and can be practiced in various ways within the scope not departing from the essence of the present invention. Furthermore, any elements of configuration disclosed in the above embodiments may be altered as appropriate. For example, some elements of configuration among all the elements of configuration indicated in an embodiment may be added to the elements of configuration in another embodiment. Alternatively or additionally, some of all the elements of configuration indicated in an embodiment may be omitted from the embodiment.

Moreover, the drawings schematically illustrate elements of configuration in order to facilitate understanding and properties of elements of configuration illustrated in the drawings, such as thickness, length, interval, and number thereof, may differ from actual properties thereof in order to facilitate preparation of the drawings. In addition, the elements of configuration indicated in the above embodiments are each an example and not limited specifically. It is needless to say that various alterations can be made within the scope not substantially departing from the effect of the present invention.

(1) In the first embodiment described with reference to FIGS. 1 and 2, the maximum value of the width dn (i.e., the width dn of the unit electrode rn located innermost in the annular band-shaped area 12b) of the widths dn of the unit electrodes rn included in the annular band-shaped area 12b located outward in the radial direction RD may be set larger than the minimum value of the width dn (i.e., the width dn of the unit electrode rn located outermost in the annular band-shaped area 12a) of the widths of the unit electrodes rn included in the annular band-shaped area 12a located inward in the radial direction RD. In this case, the width dn of the unit electrode rn located innermost in the annular band-shaped area 12b can be inhibited from being excessively small among the widths dn of the unit electrodes rn included in the annular band-shaped area 12b located outward in the radial direction RD.

(2) In a situation in which the liquid crystal element 100, 100A, 100B, or 100C is used as a lens of eyeglasses, it is possible for example that the shape of the liquid crystal element 100, 100A, 100B, or 100C is bilaterally asymmetric only in the outer circumferential part thereof and the center (optical axis AX) of the liquid crystal element 100, 100A, 100B, or 100C is eccentrically located so as to be located beside the wearer's nose.

(3) In the liquid crystal elements 100, 100A, 100B, and 100C in the first embodiment, the second embodiment (including the variation), and the third embodiment, it is preferable that the focal length of each of the liquid crystal elements 100, 100A, 100B, and 100C, which each function as a liquid crystal lens, is longer in a part corresponding to the unit electrode rn located more outward in the radial direction RD among a plurality of parts corresponding to the respective unit electrodes rn. In the above preferable example, vision correction for a subject can be made in a natural way when the liquid crystal element 100, 100A, 100B, or 100C is used as a lens of eyeglasses. Note that a longer focal length corresponds to lower lens power.

(4) In the first embodiment, the second embodiment (including the variation), and the third embodiment, the liquid crystal elements 100, 100A, 100B, and 100C may each have a plurality of mutually different optical axes. In this case, the liquid crystal elements 100, 100A, 100B, and 100C can each constitute an assembly of lenses.

For example, a plurality of electrode placement areas (electrode placement areas 11 or electrode placement areas 11A) are provided in one of the liquid crystal elements 100, 100A, and 100B. As a result, an assembly of lenses is formed in the one liquid crystal element 100, 100A, or 100B. This case is effective because the length of the individual annular electrodes (the first annular electrodes C1 and the second annular electrodes C2) or the individual arcuate electrodes (the first arcuate electrodes 1 and the second arcuate electrodes 2) can be reduced. A function like a multifocal lens with effects of variable lens power added can be provided to a wearer of the eyeglasses. Note that in any of the liquid crystal elements 100, 100A, and 100B, the electrode placement areas may have the same configuration or different configurations. The same applies also to the liquid crystal element 100C in the third embodiment.

(5) In the first embodiment, the second embodiment (including the variation), and the third embodiment, the focal length, the light transmittance, and/or the lens power can be controlled for each annular band-shaped area 12, each circular area 111, each arcuate band-shaped area 113, each circumferential direction area Fpq, and/or each non-circular area 117. In this case, for example, the voltage value (e.g., the effective value) and the frequency of each of the first voltage V1 (including the first voltage Vpq1) and the second voltage V2 (including the second voltage Vpq2) are controlled for each annular band-shaped area 12, each circular area 111, each arcuate band-shaped area 113, each circumferential direction area Fpq, and/or each non-circular area 117.

As such, it is only required in the present description that the first voltage V1 and the second voltage V2 differ from each other in each unit electrode rn. The first voltage V1 may be the same or different among the unit electrodes rn. Furthermore, the second voltage V2 may be the same or different among the unit electrodes rn. In other words, the first voltage V1 may be the same or different and the second voltage V2 may the same or different in the annular band-shaped areas 12, the arcuate band-shaped areas 113, or the non-circular areas 117. Also, the first voltage V1 may be the same or different and the second voltage V2 may the same or different between the annular band-shaped areas 12, the circular area 111, the arcuate band-shaped areas 113, and the non-circular areas 117.

(6) No particular limitations are placed on usage of the liquid crystal elements 100, 100A, 100B, and 100C. However, the liquid crystal elements 100, 100A, 100B, and 100C can be utilized each as a tool for focal point control when applied to a head mounted display or a goggle for realization of for example virtual reality (VR), augmented reality (AR), or mixed reality (MR). In these cases, the liquid crystal elements 100, 100A, 100B, and 100C may perform astigmia correction, for example.

Furthermore, the liquid crystal elements 100, 100A, 100B, and 100C can be applied to a contact lens or a lens of eyeglasses for eye treatment, a contact lens or a lens of eyeglasses for vision aids, or a contact lens or a lens of eyeglasses for eye training. For example, the liquid crystal elements 100, 100A, 100B, and 100C can be applied for various applications such as therapy by reducing the lens power or reducing the light transmittance for each annular band-shaped area 12, each circular area 111, each arcuate band-shaped area 113, each circumferential direction area Fpq, and/or each non-circular area 117.

(7) The liquid crystal elements 100 and 100A to 100C described with reference to FIGS. 1 to 11 can each be utilized as a contact lens or a lens of eyeglasses. Furthermore, the shape of the liquid crystal elements 100 and 100A to 100C is not limited to the planar shape (FIG. 5) and may be a curved shape. In a case for example in which the liquid crystal elements 100 and 100A to 100C are utilized each as a contact lens, the liquid crystal elements 100 and 100A to 100C can be curved along the surface of an eyeball.

(8) In liquid crystal element 100C of the third embodiment, the radial direction number p is not limited to 2 and may be 1 or 3 or more. As such, no particular limitations are placed thereon. That is, the number of the circumferential direction areas Fpq and the number of the liquid crystal lens parts Bpq are not limited specifically in the radial direction RD. Also, the circumferential direction number q is not specifically limited so long as it is 2 or more. That is, for example, the number of the circumferential direction areas Fpq and the number of the liquid crystal lens parts Bpq are not limited specifically so long as they are 2 or more in the circumferential direction CD. Note that paired liquid crystal parts Bpq forming a liquid crystal lens part set Jpk may have different focal lengths, for example. Furthermore, paired circumferential direction areas Fpq forming a circumferential direction area set Mpk may set different focal lengths, for example.

(9) The third embodiment and the second embodiment (including the variation) may be combined. For example, the liquid crystal element 100C in the third embodiment may have the non-circular areas 117 in the second embodiment.

(10) In the present description, the term "annular" refers to not only an annular shape with no partial breakage but also an annular shape with partial breakage. For example, the term "annular" refers to not only an annular shape with a central angle of 360 degrees but also an annular shape with a central angle of around 360 degrees. The words "around 360 degrees" means an angle of more than or equal to (360×0.95), for example. Also, no particular limitations are placed on the "central angle of an arc" as long as the "arc shape" does not include the "annular shape". In the present description, for example, the central angle of the "arc" is preferably less than or equal to 270 degrees, and more preferably less than or equal to 180 degrees. Also, the central angle of the "arc" may be less than or equal to 90 degrees or less than or equal to 45 degrees. For example, each central angle of the first arcuate electrodes 1, the second arcuate electrodes 2, and the arcuate band-shaped areas 113 is preferably less than or equal to 270 degrees, and more preferably less than or equal to 180 degrees. For example, each central angle of the first arcuate electrodes 1, the second arcuate electrodes 2, and the arcuate band-shaped areas 113 may be less than or equal to 90 degrees or less than or equal to 45 degrees.

INDUSTRIAL APPLICABILITY

The present invention provides a liquid crystal element and has industrial applicability.

REFERENCE SIGNS LIST

1, Gpq First arcuate electrode
2, Hpq Second arcuate electrode
11, 11A Electrode placement area
12 Annular band-shaped area
21 First radial direction lead wire
22 Second radial direction lead wire
31 First circumferential direction lead wire
32 Second circumferential direction lead wire
100, 100A to 100C Liquid crystal element
111 Circular area
113 Arcuate band-shaped area
117 Non-circular area
C1 First annular electrode
C2 Second annular electrode
CT Center electrode
rn Unit electrode
LQ Liquid crystal layer
Fpq Circumferential direction area
Mpk Circumferential direction area set

The invention claimed is:

1. A liquid crystal element comprising:
a liquid crystal layer;
a plurality of first arcuate electrodes disposed concentrically about an optical axis of the liquid crystal element and configured to apply first voltage to the liquid crystal layer; and
a plurality of second arcuate electrodes disposed concentrically about the optical axis and configured to apply second voltage to the liquid crystal layer, wherein
the liquid crystal element has an electrode placement area in which the first arcuate electrodes and the second arcuate electrodes are disposed,
each of unit electrodes is constituted by one of the first arcuate electrodes and one of the second arcuate electrodes adjacent to each other in a radial direction to the optical axis, the unit electrodes being arranged side by side in the radial direction in the electrode placement area,
the liquid crystal element further comprises high-resistance layers each having a higher electrical resistivity than the first arcuate electrodes and the second arcuate electrodes, the high-resistance layers each being disposed between a corresponding one of the first arcuate electrodes and a corresponding one of the second arcuate electrodes in a plan view,
the liquid crystal element further comprises a core electrode and a center electrode, the core electrode being disposed in a part, of the electrode placement area, through which the optical axis passes, the center electrode forming a potential gradient between the center electrode and the core electrode in the electrode placement area,
a unit electrode of the unit electrodes that is located outside of a specific location in the radial direction has a radius Rn smaller than a radius Un expressed by formula (1) and formula (2), where a subscript n indicates an n-th location from the optical axis, and
the formula (2) includes a radius Sc of the center electrode:

$$Sn - 0.1 \times Sn \leq Un \leq Sn + 0.1 \times Sn \tag{1}$$

$$Sn = (n+1)^{\frac{1}{2}} \times Sc. \tag{2}$$

2. The liquid crystal element according to claim 1, wherein
the electrode placement area includes an annular band-shaped area,
the annular band-shaped area includes a plurality of arcuate band-shaped areas arranged side by side in a circumferential direction about the optical axis,
at least one first arcuate electrode of the first arcuate electrodes and at least one second arcuate electrode of the second arcuate electrodes are disposed in each of the arcuate band-shaped areas.

3. The liquid crystal element according to claim 2, wherein
the electrode placement area includes a plurality of the annular band-shaped areas,
the annular band-shaped areas are arranged side by side in a radial direction to the optical axis, and the number of the arcuate band-shaped areas included in an annular band-shaped area, of the annular band-shaped areas, located outward in the radial direction is larger than the number of the arcuate band-shaped areas included in an annular band-shaped area, of the annular band-shaped areas, located inward in the radial direction.

4. The liquid crystal element according to claim 2, further comprising:
at least one first annular electrode configured to apply the first voltage to the liquid crystal layer; and
at least one second annular electrode configured to apply the second voltage to the liquid crystal layer, wherein
the electrode placement area further includes a circular area located inside of the annular band-shaped area in a radial direction to the optical axis, and
the at least one first annular electrode and the at least one second annular electrode are disposed in the circular area.

5. The liquid crystal element according to claim 4, wherein
the center electrode is disposed inside of the at least one first annular electrode and the at least one second annular electrode in the radial direction,
the at least one first annular electrode and the at least one second annular electrode adjacent to each other in the radial direction constitute a unit electrode, and
out of the unit electrode constituted by the at least one first annular electrode and the at least one second annular electrode and the unit electrodes each constituted by one of the first arcuate electrodes and one of the second arcuate electrodes, a unit electrode located outside of the specific location in the radial direction has a radius Rn smaller than the radius Un expressed by the formula (1) and the formula (2).

6. The liquid crystal element according to claim 2, wherein
the electrode placement area further includes a non-circular area located outside of the annular band-shaped area in a radial direction to the optical axis, and
at least one first arcuate electrode of the first arcuate electrodes and at least one second arcuate electrode of the second arcuate electrodes are disposed in the non-circular area.

7. The liquid crystal element according to claim 1, further comprising:
a first radial direction lead wire extending outward in a radial direction to the optical axis; and
a second radial direction lead wire extending outward in the radial direction, wherein
the first radial direction lead wire is connected to one end of a first arcuate electrode of the first arcuate electrodes,
the second radial direction lead wire is connected to one end of a second arcuate electrode of the second arcuate electrodes,
the first radial direction lead wire has a resistance per unit length lower than a resistance per unit length of each of the first arcuate electrodes, and
the second radial direction lead wire has a resistance per unit length lower than a resistance per unit length of each of the second arcuate electrodes.

8. The liquid crystal element according to claim 7, further comprising
a first circumferential direction lead wire extending in a circumferential direction about the optical axis; and
a second circumferential direction lead wire extending in the circumferential direction, wherein the first circumferential direction lead wire and the second circumferential direction lead wire are disposed outside of the first arcuate electrodes and the second arcuate electrodes in the radial direction,
one end of the first circumferential direction lead wire is connected to an end of the first radial direction lead wire in the radial direction,
one end of the second circumferential direction lead wire is connected to an end of the second radial direction lead wire in the radial direction,
the first circumferential direction lead wire has a resistance per unit length lower than a resistance per unit length of each of the first arcuate electrodes, and
the second circumferential direction lead wire has a resistance per unit length lower than a resistance per unit length of each of the second arcuate electrodes.

9. The liquid crystal element according to claim 1, further comprising
a first annular electrode configured to apply the first voltage to the liquid crystal layer; and
a second annular electrode configured to apply the second voltage to the liquid crystal layer, wherein
the electrode placement area includes:
a circular area in which the first annular electrode and the second annular electrode are disposed; and
a non-circular area located outside of the circular area in a radial direction to the optical axis, and
at least one first arcuate electrode of the first arcuate electrodes and at least one second arcuate electrode of the second arcuate electrodes are disposed in the non-circular area.

10. The liquid crystal element according to claim 1, wherein
the electrode placement area includes a plurality of circumferential direction areas arranged side by side in a circumferential direction about the optical axis,
at least one first arcuate electrode of the first arcuate electrodes and at least one second arcuate electrode of the second arcuate electrodes are disposed in each of the circumferential direction areas, and
the circumferential direction areas include at least two circumferential direction areas that set different focal lengths.

11. The liquid crystal element according to claim 10, the at least two circumferential direction areas cause an astigmatism by setting the different focal lengths.

12. The liquid crystal element according to claim 10, wherein
paired circumferential direction areas of the circumferential direction areas set substantially the same focal length, the paired circumferential direction areas being located opposite to each other in a radial direction to the optical axis with the optical axis therebetween.

13. The liquid crystal element according to claim 12, wherein
the number of the circumferential direction areas is an even number,
the number of circumferential direction area sets is an even number, the circumferential direction area sets each being the paired circumferential direction areas, and
the even number of circumferential direction area sets include at least two circumferential direction area sets that set different focal lengths.

14. The liquid crystal element according to claim 10, wherein each of the circumferential direction areas has a central angle of less than or equal to 90 degrees.

15. The liquid crystal element according to claim 1, wherein
the specific location is a location at which a unit electrode, of the unit electrodes, with a width of less than or equal to 200 μm is disposed, and
the width of each of the unit electrodes is a distance between a corresponding one of the first arcuate electrodes and a corresponding one of the second arcuate electrodes in the radial direction.

16. The liquid crystal element according to claim 1, wherein
a radius Rn of a unit electrode of the unit electrodes that is located inside of the specific location in the radial direction is represented by the radius Un represented by the formula (1) and the formula (2).

17. Eyeglasses comprising
the liquid crystal element according to claim 1.

18. A head mounted display comprising
the liquid crystal element according to claim 1.

19. A contact lens comprising
the liquid crystal element according to claim 1.

\* \* \* \* \*